(12) United States Patent
Olsen et al.

(10) Patent No.: US 11,414,111 B1
(45) Date of Patent: Aug. 16, 2022

(54) SYSTEM AND METHOD FOR RAILROAD PERSONNEL SAFETY ASSURANCE

(71) Applicant: BNSF Railway Company, Fort Worth, TX (US)

(72) Inventors: Eric Peter Olsen, Willow Park, TX (US); Shanmugasundaram Rajasubramanian, Tamil Nadu (IN); Nithin Paul Mathew, Electronic (IN); Marutha Pandian Jagadesan, Tamil Nadu (IN); Michael Howard, Wichita, KS (US); David Himmelstein, Flower Mound, TX (US); Aamir Ahmad Halim, Northlake, TX (US); Wayne Morgan, Azle, TX (US); Amit Kumar Dash, Bedford, TX (US); Jacob Bunkley, Arlington, TX (US); Dickson Waudo, Fort Worth, TX (US); William Stewart, Aurora, TX (US); Raven Wylie, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/403,014

(22) Filed: Aug. 16, 2021

(51) Int. Cl.
*B61L 23/34* (2006.01)
*B61L 25/02* (2006.01)
(Continued)

(52) U.S. Cl.
CPC ........... *B61L 23/34* (2013.01); *B61L 15/0072* (2013.01); *B61L 25/021* (2013.01); *B61L 25/025* (2013.01); *H04W 4/021* (2013.01)

(58) Field of Classification Search
CPC .... B61L 23/34; B61L 15/0072; B61L 25/021; B61L 25/025; H04W 4/021
See application file for complete search history.

(56) References Cited

U.S. PATENT DOCUMENTS 3,167,282 A * 1/1965 Reigh ..................... B61L 1/06
246/124
4,937,795 A * 6/1990 Motegi ................. A41D 13/00
340/539.1
(Continued)

FOREIGN PATENT DOCUMENTS

IN   01163KO2015 A   12/2015
WO   2020169179 A1   8/2020
(Continued)

OTHER PUBLICATIONS

Ayob, Mohd Asraf; Destination alarm notification for public transportation passenger using Geo-Fence in mobile App; IOP Conf. Series: Earth and Environmental Science 169 (2018) 012087;Bristol, England.

(Continued)

*Primary Examiner* — Russell Frejd
(74) *Attorney, Agent, or Firm* — Enrique Sanchez; Whitaker Chalk Swindle & Schwartz PLLC

(57) ABSTRACT

A system for enhancing personnel safety on a railroad track is presented. The system can receive data from sensors and/or a PTC system to determine positions of clients/worker and/or vehicles, and further utilize such data to determine if a vehicle is within a certain proximity of the client/worker location. The system can further generate geofences around clients/vehicles to and determine when such geofences intersect one another. Additionally, the present disclosure can assign severity levels and generate alerts with the assigned severity levels, and such severity levels can indicate how close a vehicle is to a particular location. It is an object of the invention to provide a system for generating alerts to notify personnel when they much retreat to a place of safety.

20 Claims, 9 Drawing Sheets

(51) Int. Cl.
*H04W 4/021* (2018.01)
*B61L 15/00* (2006.01)

(56) References Cited

U.S. PATENT DOCUMENTS

| | | | | |
|---|---|---|---|---|
| 5,554,982 | A * | 9/1996 | Shirkey | B61L 3/004 246/122 R |
| 5,907,294 | A * | 5/1999 | Welte | B61L 23/06 340/903 |
| 5,924,651 | A * | 7/1999 | Penza | B61L 23/06 246/124 |
| 6,113,037 | A * | 9/2000 | Pace | B61L 23/06 246/124 |
| 6,232,887 | B1 * | 5/2001 | Carson | B61L 23/06 340/4.21 |
| 6,471,162 | B1 * | 10/2002 | Pace | B61L 23/06 246/124 |
| 7,075,427 | B1 * | 7/2006 | Pace | B61L 23/06 246/125 |
| 7,167,082 | B2 * | 1/2007 | Stigall | B60Q 1/52 340/407.1 |
| 7,624,952 | B1 * | 12/2009 | Bartek | B61L 23/06 246/124 |
| 7,848,765 | B2 | 12/2010 | Phillips et al. | |
| 8,531,293 | B2 | 9/2013 | Putz | |
| 8,755,824 | B1 | 6/2014 | Wang et al. | |
| 9,867,023 | B2 | 1/2018 | Rauner | |
| 9,986,377 | B2 | 5/2018 | Li et al. | |
| 10,268,909 | B2 | 4/2019 | Sathyanarayana et al. | |
| 10,349,207 | B2 | 7/2019 | Baca et al. | |
| 10,757,540 | B1 | 8/2020 | Klinkner et al. | |
| 2011/0127389 | A1 * | 6/2011 | Bartek | B61L 1/02 246/124 |
| 2011/0148626 | A1 | 6/2011 | Acevedo | |
| 2013/0304286 | A1 * | 11/2013 | Ehrler | B61L 23/06 701/19 |
| 2017/0088046 | A1 * | 3/2017 | Denny | B61L 29/24 |
| 2019/0340909 | A1 | 11/2019 | Nguyen et al. | |
| 2019/0380020 | A1 | 12/2019 | Pellegrini et al. | |
| 2020/0017131 | A1 * | 1/2020 | Houghton | B61L 27/0077 |
| 2020/0160682 | A1 | 5/2020 | Johnson et al. | |
| 2020/0286355 | A1 | 9/2020 | Baker, Jr. | |

FOREIGN PATENT DOCUMENTS

| | | | |
|---|---|---|---|
| WO | 2020191004 | A1 | 9/2020 |
| WO | 2020197418 | A1 | 10/2020 |

OTHER PUBLICATIONS

BNSF Railway Company; New BNSF Geofence Notifications Tool: Available Now for Intermodal Customers; Aug. 11, 2020; pp. 1-3; Fort Worth, Texas, US; https://www.bnsf.com/news-media/customer-notifications/notification.page?notId=new-bnsf-geofence-notifications-tool-available-now-for-intermodal-customers.

Bosch; Smart railroad giants; pp. 1-8; Oct. 9, 2020; https://www.bosch.com/stories/smart-trains/.

Eleksen;How can Eleksen™ improve rail worker safety; 2020; Enderby, Leicester, UK; https://eleksen.com/rail/.

Garzon,Sandro Rodriguez; Infrastructure-assisted Geofencing: Proactive Location-based Services with Thin Mobile Clients and Smart Servers; 2015 3rd IEEE International Conference on Mobile Cloud Computing, Services, and Engineering; Mar. 1, 2015; pp. 1-11; IEEE; https://www.researchgate.net/profile/Sandro_Garzon/publication/280921071_Infrastructure-Assisted_Geofencing_Proactive_Location-Based_Services_with_Thin_Mobile_Clients_and_Smart_Servers/links/55cb3a3e08aeb975674b0629.pdf.

Graysom, Limdsay M.et al.; Accuracy of WAAS-Enabled GPS-RF Warning Signals When Crossing a Terrestrial Geofence; Jun. 18, 2016; pp. 1-8; MDPI; Basel, Switzerland.

Nayak; Bhavyashree; GeoFencing-Based Accident Avoidance Notification for Road Safety; Department of Information Science and Engineering,NITTE Meenakshi Institute ofTechnology; Sep. 11, 2019; pp. 1-3; Bengaluru, India.

Perrero, Megan; Vital Protection During Critical Work; Mass Transit Mag.com; Apr. 23, 2020; pp. 1-12; Endeavor Business Media, Nashville, TN, US; https://www.masstransitmag.com/rail/maintenance/railroad-right-of-way-and-maintenance-of-way-equipment/article/21133756/dependable-protection-for-vital-workers.

Smith, Claire;Track worker safety targeted by Network Rail geofencing design contest; New Civil Engineer; Aug. 20, 2020; pp. 1-3; London, UK. https://www.newcivilengineer.com/latest/track-worker-safety-targeted-by-network-rail-geofencing-design-contest-20-08-2020/.

* cited by examiner

SYSTEM AND METHOD FOR RAILROAD PERSONNEL SAFETY ASSURANCE

TECHNICAL FIELD

The present disclosure relates generally to enhancing safety of personnel working on railroad tracks, especially with respect to preventing collision of rail vehicles with personnel.

BACKGROUND

Rail transport systems traverse entire continents to enable the transport and delivery of passengers and goods throughout the world. A quintessential component of railroad infrastructure is the track—laid over a myriad of geographies and terrains, railroad tracks are designed to withstand the worst of the elements and facilitate disbursement of locomotives throughout the railroad system. Because of this constant exposure of the tracks to hazardous conditions, railroad companies must be vigilant in maintaining track integrity; if a section of track is compromised and the damage or obstruction is not quickly addressed, the consequences can be catastrophic.

There are millions of components in any given railroad infrastructure, and track integrity must be maintained at all times to ensure the safe travel of freight cars on the tracks. Some maintenance work can be performed by single works, while other maintenance work can require entire crews. Due to the sheer size of railroad infrastructure and general cost constraints, optimizing personnel utilization is extremely important, and oftentimes workers embark on maintenance projects alone.

Working on active railroad tracks can be a dangerous undertaking, whether in a crew or working alone. Because of the need to meet deadlines, deliver freight, etc., many track requiring maintenance remain active while particular work is being performed. As such, a train may come blasting down the rails directly where personnel are tending to the track—one mistake on the part of the worker can be fatal. While workers can sometimes hear and/or see a train coming with enough notice to vacate the track, there are all too many times when a second's misjudgment leads to a death on the railroad. Such problem is compounded by weather impeding visibility and hearing, such as snowstorms, rainstorms, etc., as well as by solo-projects, where workers cannot rely on one another to warn of impending trains. Further, while oncoming trains will also attempt to sound a horn when the conductor/engineer sees a crew on the horizon, this is not always effective, whether due to human error or other factors like those discussed above. When workers do become aware of an approaching train, they retreat to a place of safety somewhere proximate the track. This can be an issue in and of itself—if a worker is on a bridge, the worker may have to traverse a significant length of the bridge to arrive at a safe location.

With these dangers in mind, currently, workers submit a plan regarding where they will be working, a date and time of the work to be performed, and an estimated sighting distance (e.g. the visibility down a track from that particular work location, e.g., such that a train can be seen) to make sure personnel have at least a general distance and/or reaction time in mind. However, this is essentially an exercise in futility—accurately estimating a sighting distance is nigh impossible when considering all of the relevant factors, including geography, track curvature, elevation, climate, etc. Additionally, the sighting distance estimation fails to address the problem of adequately notifying track personnel of oncoming trains. As an additionally caveat, the need to keep trains moving to satisfy schedules and delivery timelines often means that personnel need to continue their work for as long as possible, even with a train inbound, to minimize delays. Such efficiency concerns must be balanced with safety to ensure a safe and productive work environment.

SUMMARY

The present disclosure achieves technical advantages as a system and method for enhancing personnel safety that can generate alerts of varying severity levels accounting for the imminence of an oncoming rail vehicle. The system can account for the variabilities of vehicle distance, speed, and time of approach when assigning severity levels to alerts. The system can receive data that can be indicative of client and/or vehicle position, and can further utilize such data to forecast vehicle locations and proximity threshold satisfaction times, such as to enable the generation of alerts to clients that are not actively connected to a network. The system can further utilize one or more geofences around a client, a vehicle, or both to facilitate severity level assignment and alert generation.

The present disclosure solves the technological problem of providing a personnel alert system configured to account for vehicle location in prioritizing generated alerts. The present disclosure can determine a sighting distance from received location and division data, accounting for geography, rail curvature, climate, etc. The present disclosure can further establish one or proximity threshold around specific worker/client locations and can further utilize received position data to determine whether a vehicle has come within a particular proximity threshold. The present disclosure can generate geofences and forecast geofence intersections, and further vary severity levels of generate alerts based on temporal thresholds related to the forecasted geofence intersection. The present disclosure can receive and transmit myriads of data, generate client geofences, generate vehicle geofences, pursue different logic paths based on network connectivity, forecast locations and geofence intersections, compare locations to determine proximity threshold satisfaction, capture vicinage data, inspect vicinage data for particular artifacts, and generate specialized alerts based on captured data. Such specialized processing can provide the benefit of increasing railroad system operational efficiency by prioritizing alerts and enabling personnel to safely increase on-track maintenance time by accurately determining when to safely vacate a track due to an oncoming train.

The present disclosure improves the performance and functionality of the system itself by implementing specialized algorithms adapted to utilize and generate data related to client and vehicle locations and track division data. The system can assign severity levels related to received position data (and/or forecasted locations) in light of temporal, velocity, and proximity considerations. In contrast, traditional systems fail to offer adequate alert generation for railroad personnel working on a track, and to the extent any systems offer such functionality, such systems simply rely on often-incomplete data and assume uniform conditions without adjusting values based upon feedback values to account for, e.g., proximity thresholds, temporal thresholds, geofence generation and/or intersection, and/or imminency of vehicle approach, resulting in improperly prioritized alerts that can result in inadequate notification to track personnel while simultaneously diminishing operational efficiency.

The disclosed safety assurance system can include a server in operable communication with a database, clients, and a positive train control (PTC) system. The safety assurance system can further be in operable connection with a plurality of sensors, gauges, receivers, transceivers, cameras, sirens, speaker, lights, or any other suitable devices or mechanisms designed to measure distance, position, location, and/or capture and/or receive data related to a track. The safety assurance system can generate records containing relevant data, including vehicle identity, vehicle velocity, vehicle direction, work time and date, time and date of proximity threshold satisfaction and/or geofence intersection, safety plan data, division data, and/or any other relevant data.

It is an object of the disclosure to provide a system for enhancing personnel safety, such as by generating alerts with assigned and varying severity levels. It is a further object of the disclosure to provide a method for alerting personnel to oncoming trains. These and other objects are provided by at least the following embodiments.

In one embodiment, a system for railroad track personnel safety can include: a memory having a first database with data, thresholds, and specifications related to clients, vehicles, and railroad tracks; and a computer processor operably coupled to the memory and capable of executing machine-readable instructions to perform program steps, the program steps including: receiving a position of a client proximate a section of railroad tracks over an encrypted network; receiving a position of a vehicle proximate the section of railroad tracks over the encrypted network; generating, via the processor, a client geofence around at least a portion of the client; generating, via the processor, a vehicle geofence around at least a portion of the vehicle; generating an alert via the processor if the vehicle geofence intersects the client geofence. Wherein the program steps can further include: determining if a temporal threshold is satisfied; assigning a first severity level to the at least one alert if the temporal threshold is not satisfied; and assigning a second severity level to the at least one alert if the temporal threshold is satisfied. Wherein the program steps can further include: comparing the client position and the vehicle position; and assigning a first severity level to the alert if a first proximity threshold is satisfied. Wherein the program steps can further include: generating a second alert having a second severity level if a second proximity threshold is satisfied. Wherein the program steps can further include: receiving vicinage data; inspecting the vicinage data for one or more artifacts; and generating a second alert via the processor if one or more artifacts are detected. Wherein the vehicle can be a train.

In another embodiment, a system for generating alerts for enhancing personnel safety can include: a memory having a first database with data, thresholds, and specifications related to devices, vehicles, and train tracks; an alert device including a wireless transceiver and a sensory communicator; and a computer processor operably coupled to the memory and to the alert device, wherein the processor is capable of executing machine-readable instructions to perform program steps, the program steps including: receiving a position of a client proximate a section of railroad tracks over an encrypted network; receiving a position of a vehicle proximate the section of railroad tracks over the encrypted network; determining a track distance between the client and the vehicle; determining if the track distance satisfies a first proximity threshold; generating a first alert having a first severity level and relaying the alert to the alert device if the first proximity threshold is satisfied; determining if the track distance satisfies a second proximity threshold; and generating an second alert having a second severity level and relaying the second alert to the alert device if the second proximity threshold is satisfied. Wherein the program steps can further include: receiving division data; determining, using the division data, a geofence radius; and generating a geofence using the alert device. Wherein the program steps can further include transmitting the first alert and the second alert to at least one client. Wherein the alert device can be proximate a railroad track. Wherein the vehicle can be a train. Wherein the sensory communicator can include haptic feedback. Wherein the sensory communicator can include a sound generator. Wherein the sensory communicator can include a visual indicator.

In another embodiment, a method for enhancing personnel safety can include: positioning an alert device proximate a railroad track; receiving, via the alert device, a signal from a vehicle on the railroad track; determining a signal strength; generating an alert via the alert device if a signal strength threshold is satisfied. In another embodiment, the method can further include the steps of: determining an alert device position; determining a vehicle position; determining a track distance between the alert device and the vehicle; and generating an alert via the alert device if the track distance satisfies a proximity threshold.

In another embodiment, the present disclosure can include an alert apparatus including: a support member having a first end and a second end; a sensory communicator operably coupled to the support member, the sensory communicator including at least one sound generator and at least one visual indicator; a wireless transceiver operably coupled to the support member; and a controller operably coupled to the support member and capable of executing machine-readable instructions to perform program steps, the program steps including: generating a geofence around at least a portion of the alert device; receiving a vehicle position; determining, using the geofence and the vehicle position, if a first proximity threshold is satisfied; if the first proximity threshold is satisfied, generating a first alert having a first severity level and relaying the first alert via the sensory communicator; determining, using the geofence and the vehicle position, if a second proximity threshold is satisfied; and if the second proximity threshold is satisfied, generating a second alert having a second severity level and relaying the second alert via the sensory communicator. Wherein the program steps can further include: receiving division data; and determining a geofence radius using the division data. Wherein the visual indicator can be coupled to the apparatus proximate the first end of the support member. Wherein the second end can be configured to stabilize the apparatus in an upright position.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

Figure 1:
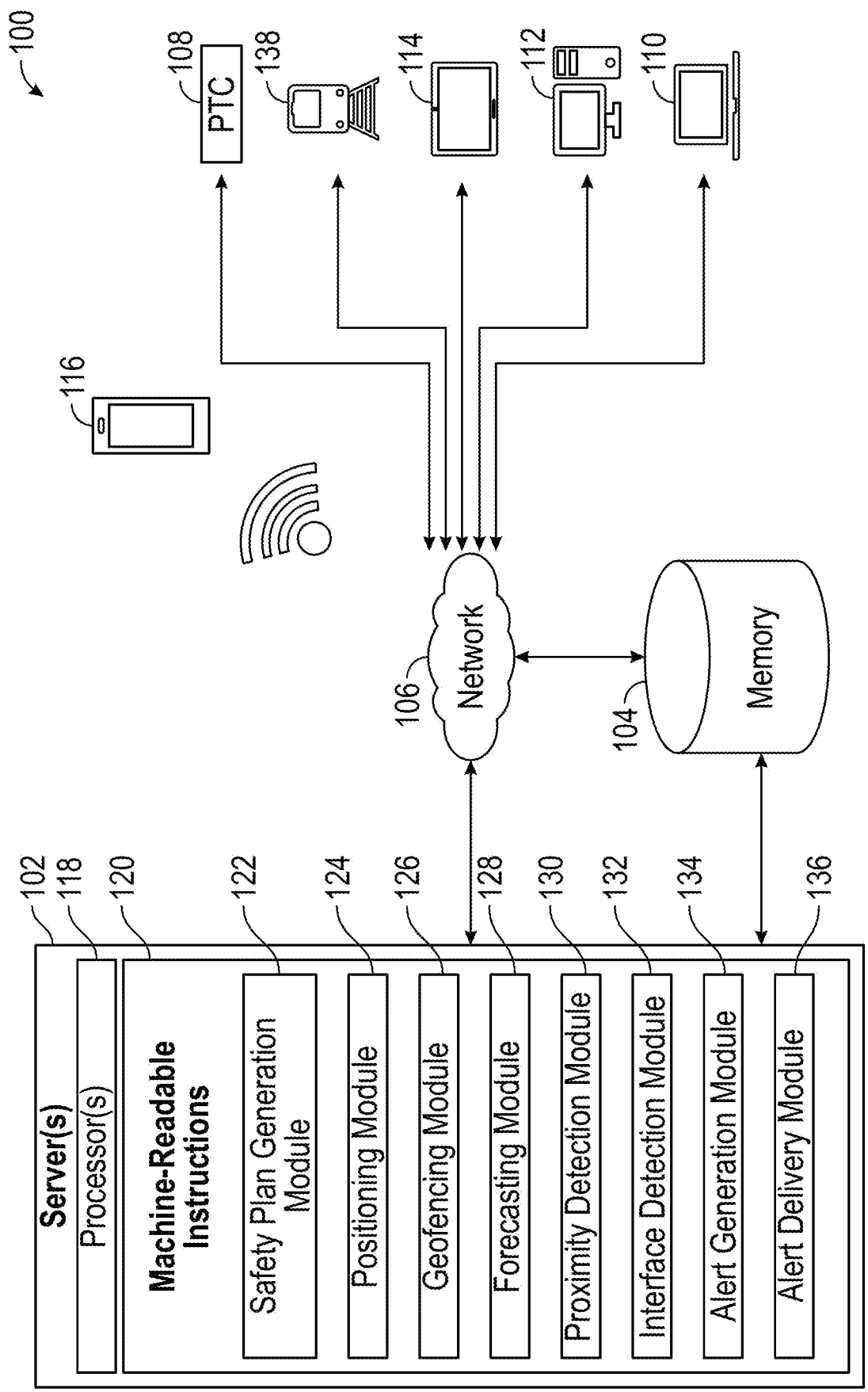
FIG. 1 illustrates a schematic view of a worker safety system, in accordance with one or more exemplary embodiments of the present disclosure.

FIG. 1 illustrates a schematic view of a worker safety system 100 in accordance with one or more embodiments of the present disclosure. The system 100 can include one or more servers 102 operably coupled to a database 104. The server 102 can be operably coupled to one or more clients 110, 112, 114, 116, 138 via a network connection 106. The clients can be a physical device (e.g., mobile phone 116, computer 110, 112, tablet 114, wearable device, worker, worker-related device, alert device, or other suitable device), program, or an application. In one example, a client can include a wearable device such as a watch, smart watch, totem, token, badge, or any other wearable device capable of receiving wireless indications and/or transmissions. In another example, a client can include a device capable of providing haptic feedback, vibration, or generating any other suitable notification indication. In another embodiment, the server 102 can be operably coupled to a positive train control (PTC) system 108 via the network 106. For example, the PTC system 108 can be like those known in the art. In another example, the PTC system 108 can be a networked computer 108 in operable connection with the server 102 that is capable of receiving and/or obtaining vehicle and worker data and transmitting the data to the server 102. In another embodiment, the server 102 can be in operable communication with a vehicle 138, such as a rail vehicle. For example, the system 100 can be configured such that the rail vehicle 138 can receive and/or transmit data to and/or from the server 102. The system 100 can be integrated with a railroad system or railroad infrastructure to facilitate the detection of defects in railroad components. It will be understood by those having skill in the art that detections, captured data, measurements, determinations, alerts, etc. encompassed by the system 100 can be promulgated and/or accessible to a railroad system at large via the network 106 or other operable connection. In one embodiment, the server 102 can include machine-readable instructions 120; in another embodiment, the server 102 can access machine readable instructions 120. In another embodiment, the machine-readable instructions can include instructions related to a safety plan generation module 122, a positioning module 124, a geofencing module 126, a forecasting module 128, a proximity detection module 130, an interference detection module 132, an alert generation module 134, and/or an alert delivery module 136.

The aforementioned system components (e.g., server(s) 102, PTC system 108, and client(s) 110, 112, 114, 116, 138 etc.) can be communicably coupled to each other via the network 106, such that data can be transmitted. The network 106 can be the Internet, intranet, or other suitable network. The data transmission can be encrypted, unencrypted, over a VPN tunnel, or other suitable communication means. The network 106 can be a WAN, LAN, PAN, or other suitable network type. The network communication between the clients, server 102, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases can be operably coupled to the system components via the network 106.

The data transmitted to and from the components of system 100 (e.g., the server 102, PTC system 108, and clients), can include any format, including JavaScript Object Notation (JSON), TCP/IP, XML, HTML, ASCII, SMS, CSV, representational state transfer (REST), or other suitable format. The data transmission can include a message, flag, header, header properties, metadata, and/or a body, or be encapsulated and packetized by any suitable format having same.

One or more server(s) 102 can be implemented in hardware, software, or a suitable combination of hardware and software therefor, and may comprise one or more software systems operating on one or more servers, having one or more processors 118, with access to memory 104. Server(s) 102 can include electronic storage, one or more processors, and/or other components. Server(s) 102 can include communication lines, connections, and/or ports to enable the exchange of information via a network 106 and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 104 internally.

Memory 104 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 120, software algorithms, control logic, data generated by processor(s), data received from server(s), data received from computing platform(s), and/or other data that can enable server(s) to function as described herein. The electronic storage can also include third-party databases accessible via the network 106.

Processor(s) 118 can be configured to provide data processing capabilities in server(s) 102. As such, processor(s) 118 can include one or more of a digital processor, an analog processor, a digital circuit designed to process information, an analog circuit designed to process information, a state machine, and/or other mechanisms for electronically processing information, such as FPGAs or ASICs. The processor(s) 118 can be a single entity or include a plurality of processing units. These processing units can be physically located within the same device, or processor(s) 118 can represent processing functionality of a plurality of devices or software functionality operating alone, or in concert.

The processor(s) 118 can be configured to execute machine-readable instructions 106 or machine learning modules via software, hardware, firmware, some combination of software, hardware, and/or firmware, and/or other mechanisms for configuring processing capabilities on processor(s) 118. As used herein, the term "machine-readable instructions" can refer to any component or set of components that perform the functionality attributed to the machine-readable instructions component 120. This can include one or more physical processors 118 during execution of processor-readable instructions, the processor-readable instructions, circuitry, hardware, storage media, or any other components.

The server(s) 102 can be configured with machine-readable instructions 120 having one or more functional modules. The machine-readable instructions 120 can be implemented on one or more servers 102, having one or more processors 118, with access to memory 104. The machine-readable instructions 120 can be a single networked node, or a machine cluster, which can include a distributed architecture of a plurality of networked nodes. The machine-readable instructions 120 can include control logic for implementing various functionality, as described in more detail below. The machine-readable instructions 120 can include certain functionality associated with the WILD system 100. Additionally, the machine-readable instructions 120 can include a smart contract or multi-signature contract that can process, read, and write data to a database, distributed ledger, or blockchain.

Figure 2:
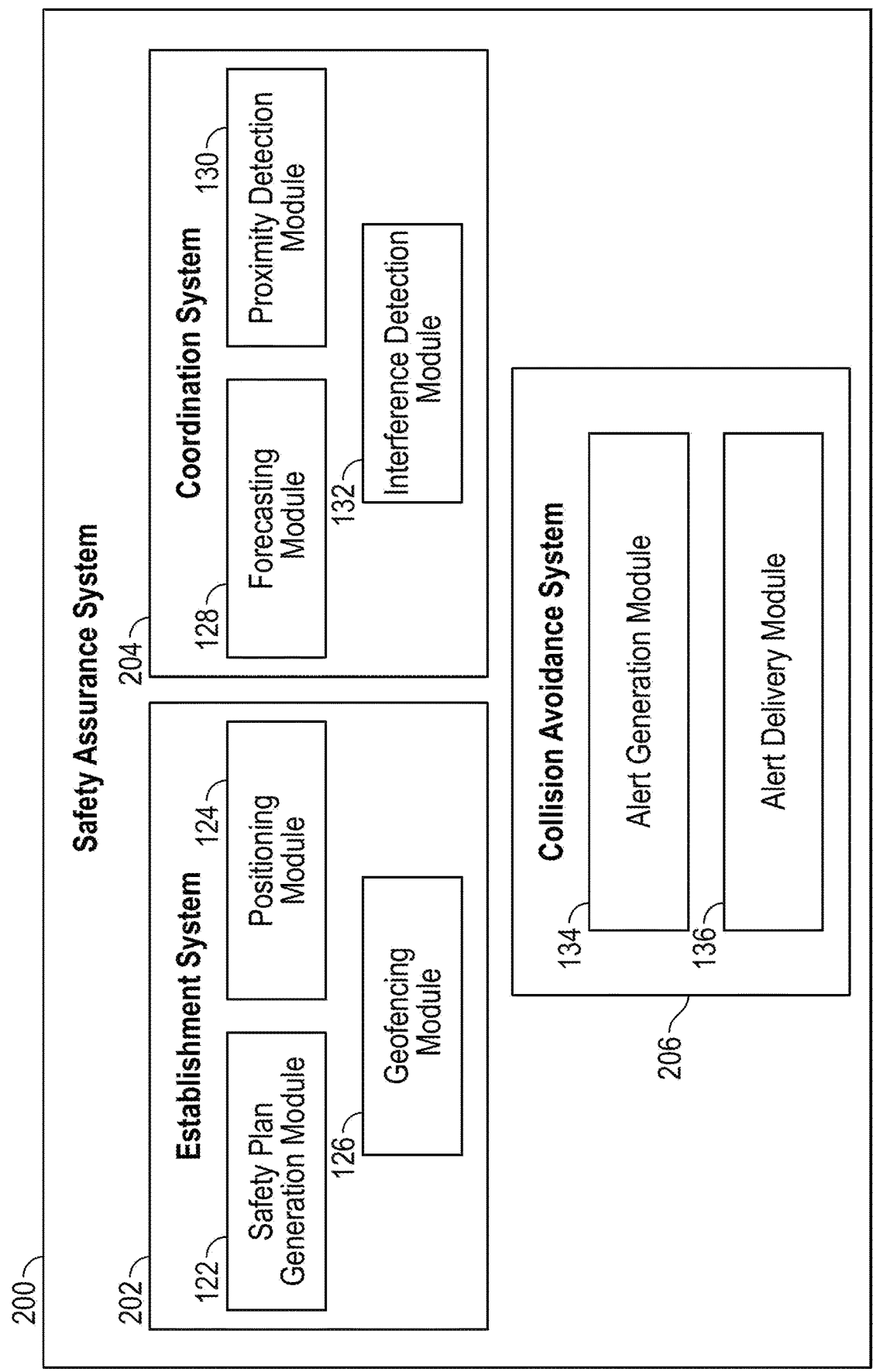
FIG. 2 illustrates an exemplary block diagram of a safety assurance system, in accordance with one or more exemplary embodiments of the present disclosure.

FIG. 2 illustrates a schematic view of a safety assurance system 200, in accordance with one or more exemplary embodiments of the present disclosure. System 200 can include an establishment system 202, a coordination system 204, and a collision avoidance system 206. In one exemplary embodiment, the establishment system 202 can include a safety plan generation module 122, a positioning module 124, and a geofencing module 126. The safety plan generation module 122, positioning module 124, and geofencing module 126 can implement one or more algorithms to facilitate the establishment of a safety plan, locations of, e.g., one or more clients and/or vehicles, and/or geofences around one or more clients and/or vehicles, such as for utilization by the coordination system 204 and/or collision avoidance system 206. In one embodiment, the establishment system 202 can be configured to initiate upon reception of an indication that, e.g., a worker will be performing work at a particular location, and subsequently generate a safety plan for such work, receive and/or determine positions of the worker and/or vehicles, and generate geofences as needed.

In one embodiment, the safety plan generation module 122 can receive an indication that work will be performed at a particular location on a railroad track. For example, the module 122 can be configured to receive a location, such as a location of a division, and/or further receive division data related to a particular division, such as topography, track curvature, grade, climate, weather, temperature, environmental data, tie composition, rail type, ballast type, ballast age, or any other data related to a division of a track. In another embodiment, the module 122 can utilize received data to generate a safety plan, such as to be used by a worker, a vehicle, or any other entity in a railroad infrastructure. For example, the safety plan can include a worker name, a date, a subdivision identifier, a work location, a sighting distance (e.g., a distance of visibility down a track from a particular location), a speed indication, and/or a method of warning a worker of an oncoming train. In another example, the safety plan generation module 122 can transmit the safety plan amongst a railroad system, or to any other relevant receiver. In another embodiment, the safety plan generation module 122 can include a set of determined alerts and/or notifications to associated with the safety plan. For example, the safety plan generation module 122 can include an indication that an alert should be generated and transmitted when particular proximity thresholds are satisfied, and/or when certain geofence intersections occur. In another example, such indications can be transmitted to the, e.g., collision avoidance system 206, such that the collision avoidance system 206 can utilize the indications in generating/transmitting alerts having proper severity levels. For example, the safety plan generation module 122 can generate a safety plan requiring generation of an alert of a particular severity level when a vehicle is a particular distance away from the work location. In this manner, the safety plan generation module 122 can be customized for a particular job and/or work/division location.

In another embodiment, the establishment system 202 can include a positioning module 124. In one example, the positioning module 124 can be configured to receive and/or determine positions of one or more railroad constituents. A railroad constituent (constituent) can include personnel, workers, clients, vehicles, assets, tracks, or any other railroad components or members. In another example, the positioning module 124 can receive coordinates of a work and/or worker location; in another example, the position module 124 can receive coordinates of a vehicle, such as a train. In another embodiment, the positioning module 124 can further receive track data, such as a map of a track. In one example, the positioning module 124 can associate position data it receives with track data that it receives, such as to determine a position and/or positions relative to a track. In another example, the positioning module 124 can be configured to receive data related to motion (e.g., changing position) of a client, vehicle, etc. For example, the positioning module 124 can receive velocity data, direction data, or any other type of position data. In one embodiment, the positioning module 124 can be operably coupled with a global positioning system that can track locations of vehicles, workers, etc.

In another embodiment, the establishment system 202 can include a geofencing module 126. For example, the geofencing module 126 can be configured to generate geofences, such as around a worker, work location, client, vehicle, or any other railroad constituent or component. In another example, the geofencing module 126 can establish proximity thresholds around a location, such as can be used by other systems of the safety assurance system 200. In one embodiment, a geofence can include a particular area surrounding a client and/or a vehicle that when intersected, can prompt control logic to perform a specific function in accordance with one or more embodiments of the present disclosure. The geofencing module 126 can utilize received data such as location data, division data, track data, or any other data suitable to assist the module 126 in generating appropriate geofences. For example, the geofencing module 126 can determine that a vehicle of a particular identity, weight, speed, direction, etc. can require a geofence of a particular size, such that any processes instantiated by control logic upon determination of intersection with such geofence can generate an alert that can ensure that the vehicle has adequate time to take a particular action. In another embodiment, the geofencing module 126 can be configured to generate geofences of predetermined sizes depending on the railroad constituent that the geofence is formed around. For example, the geofencing module 126 can be configured to generate geofences of a particular size around particular clients, and geofences of a different size around particular vehicles.

In one embodiment, the safety assurance system 200 can include a coordination system 204. For example, the coordination system can include a forecasting module 128, proximity detection module 130, and/or an interference detection module 132. In another example, the coordination system 204 can be configured to utilize data, thresholds, positions, and/or any other material from the establishment system 202. In another example, the coordination system 204 can be configured to facilitate coordination amongst railroad constituents, such as workers and vehicles. In another embodiment, the forecasting module 128, proximity detection module 130, and/or the interference detection module 132 can implement one or more algorithms to facilitate, e.g., the forecasting of client and/or vehicle positions, detection of proximity of constituents as to one another, and/or detection of interference between constituents such as intersection of geofences of constituents. In one embodiment, the coordination system 204 can be configured to instantiate upon reception of, e.g., data from the establishment system 202.

In one embodiment, the forecasting module 128 can utilize position data to forecast positions of, e.g., vehicles on a railroad track. For example, the forecasting module 128 can receive position data, such as location, speed, vehicle direction, and/or track data to forecast where a vehicle can be at a particular time. In another example, the forecasting module 128 can utilize data related to the tracks, such as speed limits, closures, train schedules, maintenance projects, maintenance schedules, and/or any other data in forecasting vehicle, worker, and/or other railroad constituent positions and/or locations. In another embodiment, the forecasting module 128 can be configured to forecast where a worker, client, or other railroad constituent can be at some point in the future based on received data. In another embodiment, the forecasting module 128 can utilize strain gauges, speedometers, GPS data, cameras, LIDAR, radar, radio, and/or any other sensors or data to forecast a vehicle position and/or location, such as on a track. In one embodiment, be forecasting module 128 can be configured to utilize the most recent position data in forecasting a vehicle location. For example, the forecasting module 128 can be configured to receive position data constantly while connected to a network, and when the network connection is lost, the forecasting module 128 can be configured to utilize the most recently received position data and modeling and/or forecasting a vehicle position. For example, the forecasting module 128 can receive position data of a vehicle including a speed and direction of the vehicle, as well as any scheduled stops, maintenance, or any other data related to the schedule of the vehicle. In another example, the forecasting module 128 can utilize the data along with division data also received to predict where on a track a vehicle will be at a given point in time.

In one embodiment, the proximity detection module 130 can be configured to detect when one or more railroad constituents are within a particular proximity of one another. For example, the proximity detection module 130 can be configured to receive and/or utilized data from the geofencing module 126, such as to determine the proximity of geofences with respect to a railroad track, and/or with respect to proximity with one another. In another embodiment, the proximity detection module 130 can be configured to receive and/or utilize data from the positioning module 124 to determine a track distance (e.g., a distance, measured along a railroad track, from one point to another on or near the railroad track) between railroad constituents. In another embodiment, the proximity detection module 130 can utilize strain gauges, speedometers, GPS data, cameras, LIDAR, radar, radio, and/or any other sensors or data to detect a constituent position and/or location, and/or constituent proximity as to another constituent, such as on or near a track. In another embodiment, the proximity detection module 130 can be configured to utilize RFID technology, Wi-Fi, cellular data, or any other technology or mechanism suitable to enable proximity detection between railroad constituents. In one example, the proximity detection module 130 can be configured to receive data from the establishment system 202 and utilized the data to determine proximity between railroad constituents.

In one embodiment, the interference detection module 132 can be configured to detect when a worker, vehicle, and/or other railroad constituent come within a particular proximity of one another. In another embodiment, the interference detection module 132 can be configured to detect when a geofence generated by the geofencing module 126 is intersected by a position and/or other geofence. In one example, track distance determined by the proximity detection module 130 can be utilized by the interference detection module 132 to determine whether a proximity threshold is satisfied—e.g., if the track distance falls below a particular proximity threshold distance, the proximity threshold can be satisfied. In another example, the interference detection module 132 can detect when a geofence is intersected, and/or when two geofences intersect one another. In another embodiment, the interference detection module 132 can utilize strain gauges, speedometers, GPS data, cameras, LIDAR, radar, radio, and/or any other sensors or data to detect interference and/or potential interference between constituents, and/or to detect proximity threshold satisfaction and/or geofence intersections, such as on or near a track.

In another embodiment, the safety assurance system 200 can include a collision avoidance system 206. The collision avoidance system 206 can include an alert generation module 134 and an alert delivery module 136. In one embodiment, the alert generation module 134 and the alert delivery module 136 can implement one or more algorithms to facilitate the generation of alerts having particular severity levels, and/or delivery/transmission/relay of such alerts amongst a system. In another embodiment, the alert generation module 134 and the alert delivery module 136 can utilize data generated and/or received and/or transmitted by the coordination system 204 and/or collision avoidance system 206. In another embodiment, the alert generation module 134 can receive data from the establishment system 202 and/or the coordination system 204. For example, the alert generation module 134 can receive a safety plan, positional data of one or more constituents, and/or geofence data. In another embodiment, the alert generation module 134 can receive forecasted constituent positions, detected proximities, and/or detected interferences (e.g. proximity threshold satisfactions and/or geofence intersections). In another embodiment, the alert generation module 134 can utilize received data to generate an alert with an assigned severity level. For example, an alert can be assigned a severity level based on a particular proximity threshold satisfaction, and/or a particular geofence intersection. For example, multiple proximity thresholds can be determined with respect to multiple different alert severity levels, such that when the proximity detection module 130 detects satisfaction of a first proximity threshold, an alert can be generated with an assigned first severity level. In another example, when the proximity detection module 130 detects satisfaction of a second proximity threshold, an alert can be generated and assigned a second severity level. In this manner, the alert generation module 134 can generate alerts with different severity levels depending on the data received from, e.g., the establishment system 202 and/or the coordination system In one embodiment, severity levels can indicate to a railroad system what action is recommended to address the alert. For example, a severity level can indicate that a vehicle should be stopped immediately. In another example, a severity level can indicate that a vehicle is within a distance from a maintenance location such that it does not have enough time to stop before reaching the maintenance location. In another example, a severity level can indicate how close one constituent is to another. In another embodiment, the severity levels of alerts generated by the alert generation module 134 can be based at least in part on proximity thresholds and/or geofences and/or satisfaction/interference thereof, respectively.

In another embodiment, the alert delivery module 136 of the collision avoidance system 206 can transmit alerts throughout a railroad system. For example, the alert delivery module 136 can receive an alert with an assigned severity level from the alert generation module 134 and communicate the alert to personnel, networked servers, or any other components in operable connection with the network or alert delivery module 136. In one embodiment, the alert delivery module 136 can transmit alerts via messages, records, or any other suitable form of communication. In another embodiment, the alert delivery module 136 can update a record with a generated alert. In another embodiment, the alert delivery module 136 can transmit an alert via an alert device. In another embodiment, the alert delivery module 136 can induce a client device to vibrate, ring, or otherwise generate an indication of alert. In another embodiment, the alert delivery module 136 can be configured to choose a particular delivery avenue depending on a severity level of a generated alert. For example, for a less-severe alert, the alert delivery module 136 can determine that the alert should be transmitted via a message notification, such as to a client device, (e.g. cell phone, smartwatch, etc.). In another example, for a more-severe alert, the alert deliver module 136 can determine that the alert should be transmitted via an alert device and/or siren and/or flashing lights, such can be proximate a work location. In another embodiment, the alert delivery module 136 can determine that an alert can be delivered via multiple methodologies.

Figure 3:
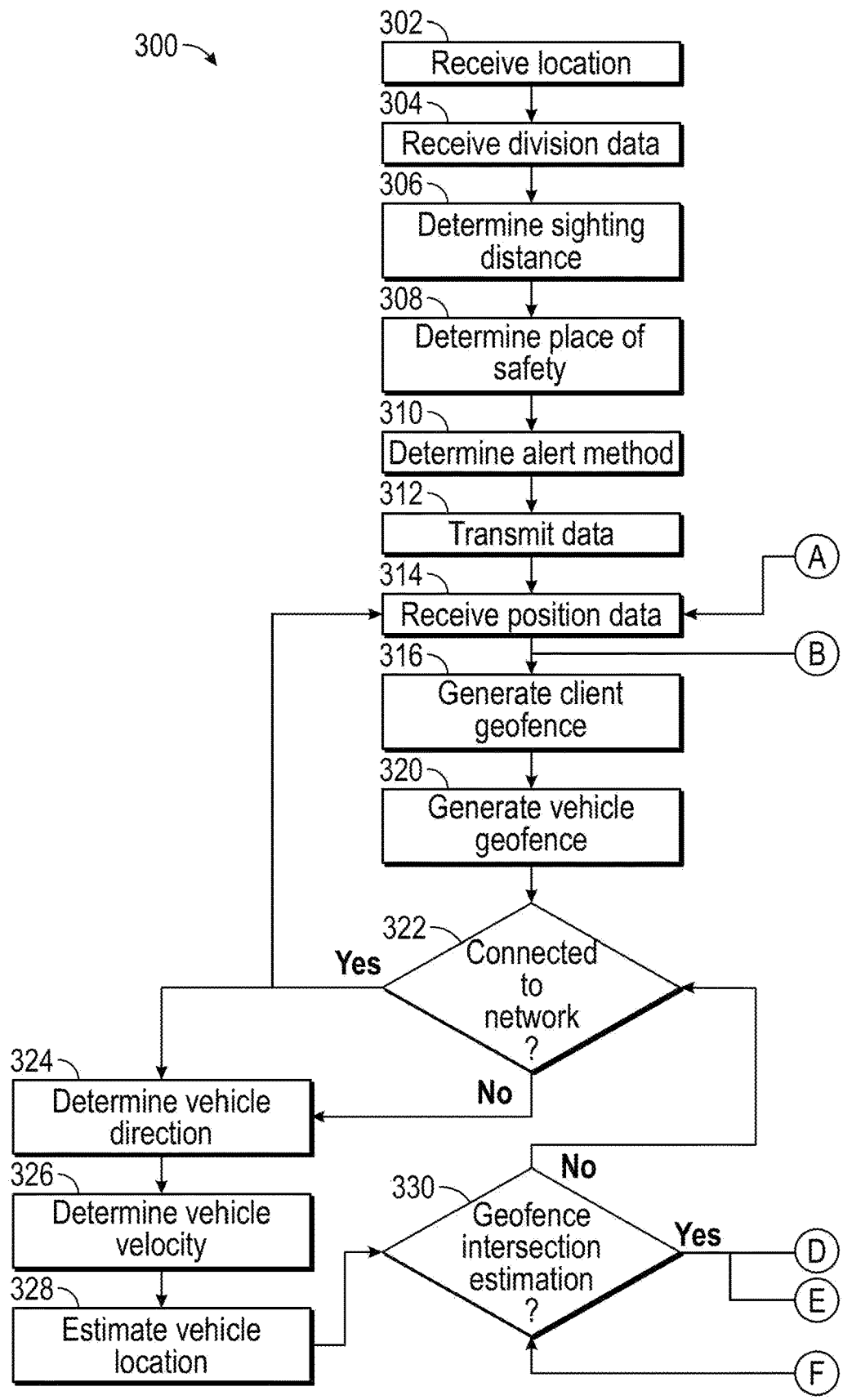
FIG. 3 illustrates a flowchart exemplifying a method of increasing personnel safety, in accordance with one or more exemplary embodiments of the present disclosure.
Figure 3:
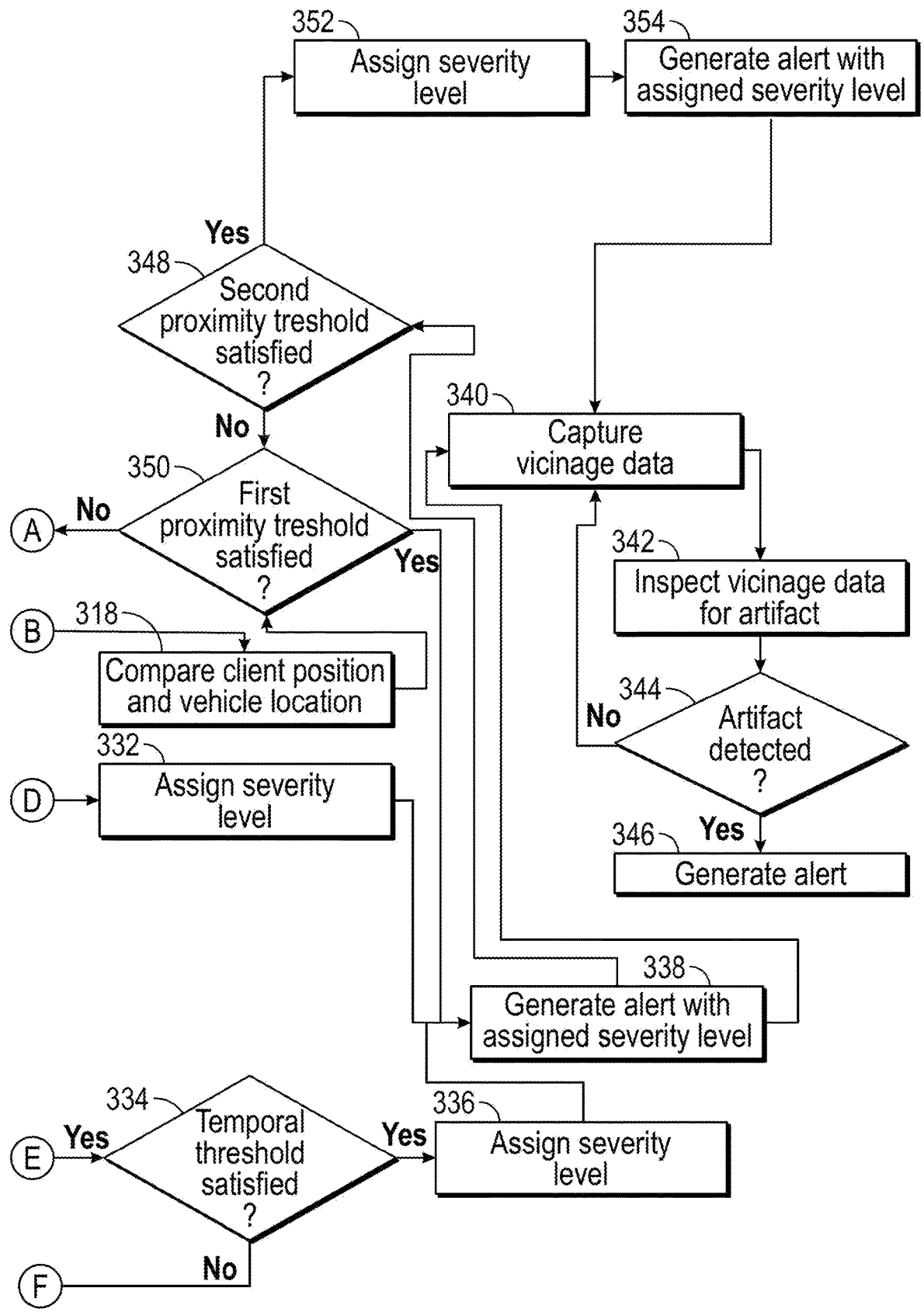

FIG. 3 illustrates a flow chart diagram 300 exemplifying control logic embodying features of a method of increasing personnel safety 300, in accordance with an exemplary embodiment of the present disclosure. The safety control logic 300 can be implemented as an algorithm on a server (e.g., server 102), a machine learning module, or other suitable system. Additionally, the safety control logic 300 can implement or incorporate one or more features of the safety assurance system 200, including the establishment system 202 (with corresponding modules 122, 124, and 126), coordination system 204 (with corresponding modules 128, 130, and 132), and collision avoidance system 206 (with corresponding modules 134 and 136). The safety control logic 300 can be achieved with software, hardware, an application programming interface (API), a network connection, a network transfer protocol, HTML, DHTML, JavaScript, Dojo, Ruby, Rails, other suitable applications, or a suitable combination thereof.

The safety control logic 300 can leverage the ability of a computer platform to spawn multiple processes and threads by processing data simultaneously. The speed and efficiency of the safety control logic 300 is greatly improved by instantiating more than one process to facilitate personnel safety. However, one skilled in the art of programming will appreciate that use of a single processing thread may also be utilized and is within the scope of the present disclosure.

The safety control logic 300 process flow of the present embodiment begins at step 302, wherein the control logic 300 receives a location. In one embodiment, the location can include a location of a constituent. In another embodiment, the location can include a location of a portion/division of the railroad track. In another embodiment, the location can include GPS coordinates. In another embodiment, the location received at step 302 can include a location where work is to be performed on a track. In another embodiment, the location can include a client location. The control logic 300 then proceeds to step 304.

At step 304, the control logic 300 can receive division data. In one embodiment, division data can include data related to a segment of a track. For example, division data can include curvature data, tie data, rail data, geography, topography, environmental data, or any other data related to a particular division of a track. In another example, division data can include a max allowed speed for a particular division. In another example, division data can include, e.g., a recommended sighting distance and/or a breaking distance. In another example, division data can include weather data, such as precipitation data. In another embodiment, the division data can include a location of the division. The control logic 300 then proceeds to step 306.

At step 306, the control logic 300 can determine a sighting distance. For example, the control logic 300 can utilize the location and/or the division data received in steps 302 and 304 to determine an appropriate sighting distance. In one example, a sighting distance can be a maximum distance a worker can see down a track from a particular location, taking into account, e.g., typography, rail curvature, environmental data, or any other relevant data. In another example, the control logic 300 can determine that the location received at step 302 is a particular distance from a curve in the track (as can be indicated by, e.g., division data received at step 304) around e.g., a hill, and can further determine that the sighting distance ends at the curve because it is not possible to see the track on the other side of the curve that is located on the other side of the hill. In another example, the control logic 300 can determine that weather conditions are present that can shorten a sighting distance, and therefore determine that a sighting distance should be lower than if weather conditions were clear. In another embodiment, a given division can include a recommended and/or default sighting distance, and the control logic 300 can determine that the default sighting distance should be utilized. In another embodiment, the control logic 300 can utilize, e.g., a max speed of a particular division (such as can be received at step 304) to determine a maximum distance that a worker should keep visible while working, and such distance can be considered a sighting distance. The control logic 300 then proceeds to step 308.

That step 308, the control logic 300 can determine a place of safety. In one embodiment, the place of safety can include a location proximate a railroad track at which a worker can be to maintain a safe distance from the track, such as if a train is traveling down the track. For example, the control logic 300 can utilizes the division data, including, for example, geographical data, to identify the closest place of safety to the position on the track that the worker is working on. In one example, if the worker is performing maintenance on a bridge, the control logic 300 can utilized the division data to determine that the closest place of safety can be at or near one of the ends of the bridge. In one embodiment, the control logic 300 can determine from the division data that the worker must travel to a particular location in order to maintain a safe distance from the track. In another embodiment, the division data can include a recommended and/or default place of safety (such as can be received at step 304), and the control logic 300 can determine that the default place of safety should be utilized. In another embodiment, the place of safety can be determined by the control logic 300 to be any area proximate a track that is a certain distance from the track. The control logic 300 then proceeds to step 310.

At step 310, the control logic 300 can determine an alert method. For example, the control logic 300 can determine that an alert generated should be transmitted via email, text, call, or any other messaging system. In another example, the control logic 300 can determine that an alert generated should be transmitted via an alert device, such as a device capable of communicating alerts in accordance with the principles of the present disclosure. In another embodiment, the control logic 300 can determine that an alert should be generated via haptic feedback generation on, for example, a wearable device. In another embodiment, the control logic 300 can determine that an alert should be transmitted via a plurality of methods. The control logic 300 then proceeds to step 312.

At step 312, the control logic 300 can transmit data. In one embodiment, the control logic 300 can transmit all or some of the data received and steps 302 through 310. In another embodiment, the control logic 300 can transmit data in the form of a safety plan. For example, the control logic 300 can generate a safety plan including identification information, a location, and/or a sighting distance, and transmit the safety plan throughout a system. The control logic 300 can transmit data to another system, personnel, a PTC system, a vehicle, or to any other suitable constituent. In one embodiment, transmission of data at step 312 can take the form of an alert and/or indication that work has begun on a particular segment and/or division of a track. In another embodiment, the transmission can indicate that work will begin at a certain point in the future. The control logic 300 then proceeds to step 314.

At step 314, the control logic 300 can receive position data. In one embodiment, position data can include a position and/or location data related to a constituent, such as a worker and/or a vehicle. In another example, position data can include velocity, direction of travel, identification information, proximity data, track data, or any other data related to a constituent or a position of a constituent with respect to a railroad track. In one example, the position data can include a position of a vehicle on a railroad track. In another example, the position data can include GPS data. The control logic then proceeds to step 316 and 318.

At step 316, the control logic 300 can generate one or more client geofences. For example, a client can include a worker, a worker device, or other constituent, and the control logic 300 can generate a geofence around the client. For example, the geofence can include in area surrounding the client, the intersection of which can be utilized by the control logic 300 to effectuate or facilitate particular functionality. In another example, a geofence can include a proximity threshold around a client, such that when a constituent intersects and/or crosses the proximity threshold, the control logic 300 can effectuate or facilitate particular functionality. The control logic 300 then proceeds to step 320.

At step 318, the control logic 300 can compare a client position with a vehicle position. For example, the control logic 300 can utilize the position data received at step 314 to determine a worker location on or proximate a track. In another example, the control logic 300 can utilize position data received at step 314 to determine a vehicle location on a track. In one embodiment, the control logic 300 can utilize the location receive at step 302 to determine a work location, and/or utilize data received at step 314 to determine a vehicle location, and subsequently compare the positions. For example, the control logic 300 can compare these positions and determine a track distance between, for example, a client position and a vehicle position. In another example, the control logic 300 can utilize data related to one or more segments of track, such as can include lengths of track or sections of track, within a division, and trace a path from one position to another along the track and determine a distance track distance from one point to another. The control logic then proceeds to step 350.

At step 320, the control logic 300 can generate one or more vehicle geofences. For example, a vehicle can include a train, a truck, a rail vehicle, or any other vehicle. In another example, the vehicle geofence can include an area surrounding the vehicle, the intersection of which can be utilized by the control logic 300 to effectuate or facilitate particular functionality. The control logic then proceeds to step 322.

At step 322, the control logic 300 can determine whether it is connected to a network. For example, the control logic 300 can search for a cellular network or a Wi-Fi network. In another embodiment, the control logic can determine whether it has a wired connection to a network. If the control logic 300 is connected to a network, the control logic can continue to receive position data at step 314 to continuously update position data for the vehicle and/or the client. If the control logic 300 is connected to a network, the control logic 300 proceeds to step 324. If the control logic 300 is not connected to a network, the control logic 300 then proceeds to step 324.

At step 324, the control logic 300 can determine a vehicle direction. For example, the control logic 300 can utilize the position data received at step 314 to trace a path traveled by the vehicle, such as on a track. In another example, the control logic can receive information from the vehicle or overarching system regarding scheduled stops from the vehicle, the vehicle travel schedule, or the direction of the vehicle. In another example, the control logic 300 can use most recent data to determine the direction the vehicle was traveling before a connection to a network was lost. For example, the control logic 300 can utilize data most recently received when a network connection is lost to determine a vehicle direction. In another example, if the control logic 300 is connected to a network, the control logic 300 can continuously determine a vehicle direction by continuously receiving position date. The control logic 300 then proceeds to step 326.

At step 326, the control logic 300 can determine a vehicle velocity. For example, the control logic can utilize the position data received in step 314 to trace a path of the vehicle and further determine the time that it took for a vehicle to travel between two points, and thereby determine the velocity that the vehicle is traveling. In another example, the control logic 300 can receive data regarding the velocity of the vehicle is traveling. In another example, the control logic 300 can receive data related to the track, such as division data, that indicates a maximum speed on that division of track. The control logic then proceeds to step 328.

At step 328, the control logic 300 can estimate a vehicle location. For example, the control logic can utilize the vehicle direction and vehicle velocity determined in steps 324 and 326 to estimate where a vehicle will be at a given point in the future. In another example, the control logic can continuously update this estimate if the control logic 300 remains connected to a network. In another embodiment, the control logic 300 can utilize the most recent data and the determination from step 324 and 326 to estimate a vehicle location. The control logic 300 then proceeds to step 330.

At step 330, the control logic 300 can determine whether a geofence intersection is predicted and/or estimated. For example, the control logic 300 can compare the estimated vehicle location from step 328 with a quiet position, such as can be indicated by the location received at step 302 or received at step 314. In another example, the control logic 300 can utilize the estimated vehicle location and the client location to compare the geofenced areas created by the client geofence and the vehicle geofence generated at steps 316 and 320, respectively. In another example, the control logic 300 can compare these geofenced areas and determine whether the areas overlap or intersect. If the control logic 300 estimates that the client geofence will intersect the vehicle geofence at the estimated vehicle location, the control logic 300 then proceeds steps 332 and 334. If the control logic 300 estimates that the client geofence will not intersect the vehicle geofence at the estimated vehicle location, the control logic 300 then proceeds back to step 322.

At step 332, the control logic 300 can assign a severity level. For example, the control logic 300 can determine a severity level for an alert to be generated and assign that severity level to the alert. For example, the control logic 300 can utilize multiple geofences around a single client and/or a single vehicle such that multiple discrete interferences can occur to which the control logic 300 can assign separate severity levels. In another embodiment, the control logic 300 can be configured to generate a multitude of alerts with different severity levels depending on the extent to which one or more estimated geofence intersections and/or temporal thresholds are satisfied. In another example, the severity alert assigned at step 332 can indicate that a geofence intersection is estimated at some point in the future. In another embodiment, the severity level assigned in step 332 can indicate that a geofence intersection is estimated at some point in the future, but that it is not imminent. Another embodiment, the severity alert assigned at step 332 can serve as a notice to personnel that a train is approaching, and further indicate that the train is a particular distance away. The control logic 300 then proceeds to step 338.

At step 334, the control logic can determine whether a temporal threshold is satisfied. For example, if a geofence intersection is estimated at step 330, the control logic 300 can determine how long it will be until such intersection is effectuated. This time can be compared to a temporal threshold. For example, if the geofence intersection is predicted for, e.g., several hours out, the control logic 300 can determine that the temporal threshold is not satisfied. In another example, if the geofence intersection is predicted for only minutes away from the current time, the control logic 300 can determine that a temporal threshold is satisfied. the temporal threshold can be of any magnitude adequate to allow the control logic 300 two successfully assign severity levels to different alerts. In another embodiment, the temporal threshold can be any time or time value suitable to serve as a temporal threshold. If the temporal threshold is satisfied, the control logic 300 then proceeds to step 336. If the temporal threshold is not satisfied, the control logic 300 then proceeds back to step 330.

At step 336, the control logic 300 can assign a severity level to the alert. For example, the severity level assigned at step 336 can indicate that a geofence intersection is estimated and that such intersection is estimated to be somewhat imminent. For example, the severity level assigned in step 336 can be of a higher severity level than the severity level assigned at step 332. In one embodiment, the temporal threshold being satisfied can indicate to the control logic 300 that the geofence intersection signifying the crossing of a vehicle at the worker location on the track will occur at a particular time in the future that will be sooner than if the temporal threshold were not satisfied. The control logic 300 then proceeds to step 338.

At step 338, the control logic 300 can generate an alert with the severity level assigned at either of steps 332 or 336. For example, the alert generated at step 338 having an assigned severity level can indicate the urgency of the alert. For example, the generated alert can signify that a train is relatively close or relatively far away. In one embodiment, the alert generated at step 338 can be generated via and/or transmitted to constituents, clients, vehicles, cell phones, tablets, wearable clients, alert devices, or via any other method or device suitable to communicate the alert. The control logic 300 then proceeds twostep 340 or 348.

At step 350, the control logic 300 can determine whether a first proximity threshold is satisfied. For example, the control logic 300 can utilize the track distance determined from the position data received at step 314 and compared at step 318, and if the track distance is of a particular magnitude, the control logic 300 can determine that first proximity threshold can be satisfied. If the first proximity threshold is not satisfied, the control logic 300 then proceeds to step 314. If the first proximity threshold is satisfied, the control logic 300 then proceeds to step 338.

At step 348, the control logic can determine whether a second proximity threshold is satisfied. For example, the control logic 300 can utilize position data received at step 314 and compared at step 318 to determine a magnitude of a track distance between a client and a vehicle. In one embodiment, if the track distance between the client and the vehicle is of a certain magnitude, the second proximity threshold can be satisfied. If the second proximity threshold is not satisfied, the control logic then proceeds to step 350. If the second proximity threshold is satisfied, the control logic then proceeds to step 352.

At step 352, the control logic 300 can assign a severity level. For example, the control logic can determine that both the first proximity threshold and the second proximity threshold have been satisfied, meaning that the vehicle is dangerously close to a client. In another embodiment, the severity level assigned at step 352 can indicate any level of severity. The control logic then proceeds to step 354.

At step 354, the control logic 300 can generate an alert with the assigned severity level. For example, the alert generated can be the same or different than the alert generated at step 338. Another embodiment, the alert generated at step 354 can be transmitted and/or generated by any number of constituents, clients, systems, or any other suitable device or entity capable of communicating an alert. The control logic 300 then proceeds to step 340.

At step 340, the control logic 300 can capture vicinage data. For example, the control logic 300 can be in operable communication with any number of sensors, cameras, microphones, or any other devices suitable to capture data. In another embodiment, the control logic 300 can capture data related to an area surrounding a particular division, such as the division at the location received in step 302. For example, the control logic 300 can utilize a camera proximate a particular division to capture visual data around the track. In another embodiment, the control logic 300 can utilize a camera or other device mounted to a vehicle to capture data in the vicinity of division. In another example, the control logic 300 can capture vicinage data by receiving the vicinage data from one or more systems, components, or constituents in the railroad infrastructure. The control logic then proceeds to step 342.

At step 342, The control logic 300 can inspect the vicinage data for artifacts. For example, the control logic 300 can inspect visual data captured at step 340. In another example, the control logic 300 can utilize any measure of software or modules to accomplish inspection. For example, the control logic 300 can utilize facial recognition, OCR, or any other functionality to determine whether personnel are within the vicinage. In another embodiment, the control logic 300 can utilize captured video data to determine whether the track is obstructed, such as by personnel, animals, debris, or other elements. The control logic 300 then proceeds to step 344.

At step 344, the control logic 300 can determine whether the inspection in step 342 detected an artifact. For example, the control logic 300 can determine whether a person is present in visual data capture at step 340. In another embodiment, the control logic 300 can inspect the data for any other type of artifact, including voice patterns, particular noises, shapes, movement, or any other suitable artifact. If the control logic 300 does not detect an artifact, the control logic 300 then proceeds to step 340. If the control logic 300 detects an artifact, the control logic then proceeds to step 346.

At step 346, the control logic 300 can generate an alert. For example, the control logic 300 can initiate a siren, horn, flashing lights, message, or any other type of alert indicating that an artifact was detected in the vicinage of the division. In another embodiment, the alert generated at step 346 can be in the form of a train horn configured to notify personnel within the vicinage that the train is imminently approaching. For example, the control logic 300 can initiate a train horn if an artifact is detected. In another embodiment, the alert generated in step 346 can be any alert suitable to notify personnel, the system, or any constituents of an approaching vehicle in the vicinity. The control logic 300 can then terminate or repeat any of the aforementioned steps.

In one embodiment, steps 302, 304, 306, 308, 310, 312, 314, 316, and 320 can correspond to the establishment system 202. In another embodiment, steps 318, 322, 324, 326, 328, 330, 334, 348, 350, 340, 342, and 344 can correspond to the coordination system 204. Another embodiment, steps 332, 336, 338, 352, 354, and 346 can correspond to the collision avoidance system 206.

In one embodiment, the safety control logic 300 can be implemented on a client device. For example, a client device (e.g., cell phone, alert apparatus, wearable device, smartwatch, etc.) can be configured to execute one or more steps of the safety control logic 300. For example, a client device can be configured to perform, e.g., all or some of steps 302-314, 316, 320-338. In one embodiment, a client device can lose connection with a network, but be configured to determine geofence intersection estimates, temporal threshold satisfaction determination, severity level assignments, alert generations, etc. based off of the most recently received data from when the client was connected with a network. For example, if the client (and control logic 300) maintains a network connection, the control logic 300 can update and real time to facilitate seps 302-346. In another example, a client executing control logic 300 can enable alert generation based on the most-recently-available data, such that if a worker is carrying a client device and loses connection to a network, the control logic 300 can continue to execute and generate alerts based on estimations contained therein. In this manner, the control logic 300 can utilize forecasts to assign severity levels and generate alerts, even if such alerts are contained to a client device and/or devices in operable communication with the client device.

Figure 4:
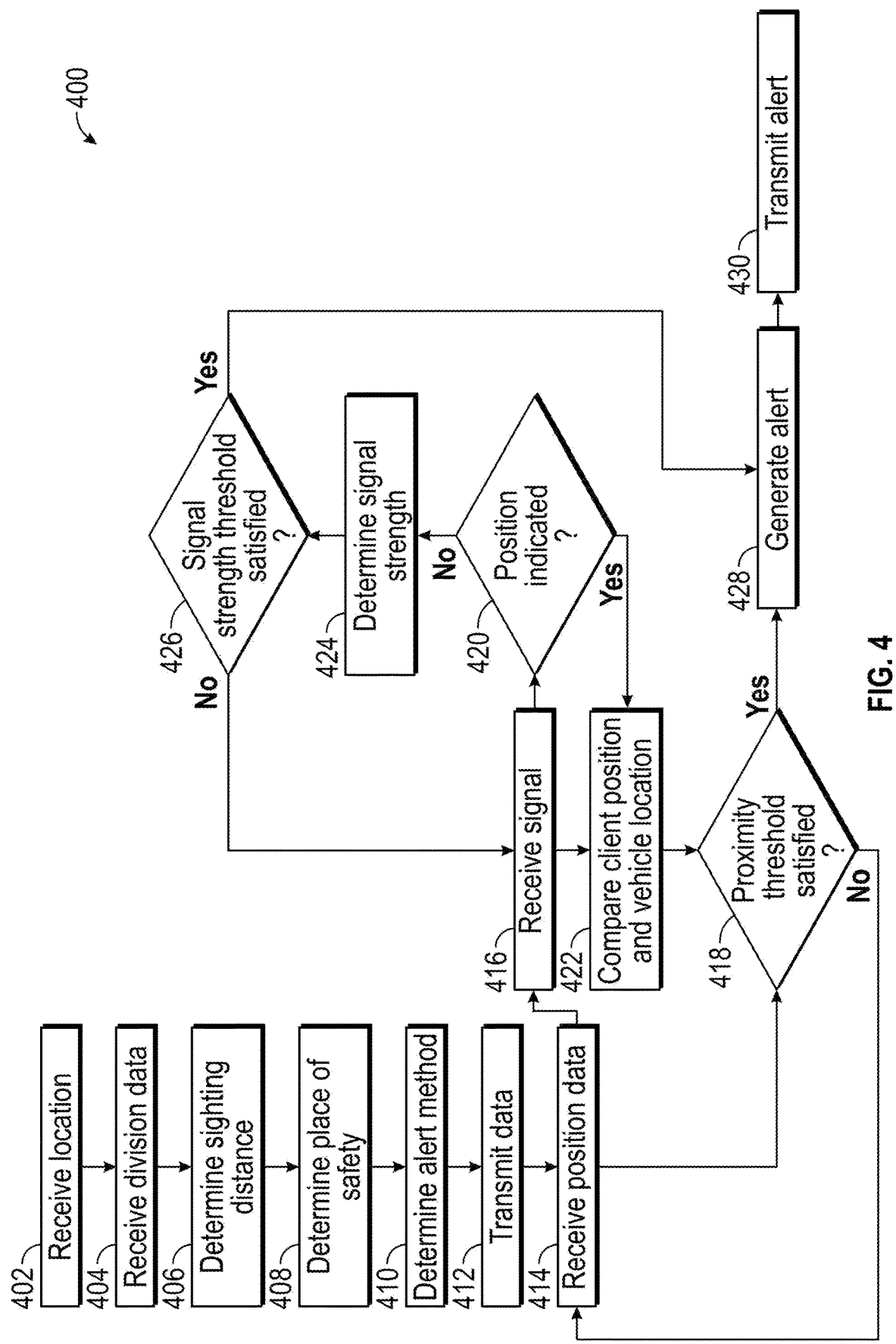
FIG. 4 illustrates a flowchart exemplifying personnel safety system control logic, in accordance with one or more exemplary embodiments of the present disclosure.

FIG. 4 illustrates a flow chart diagram 400 exemplifying control logic embodying features of a method of enhancing personnel safety 400, in accordance with an exemplary embodiment of the present disclosure. The personnel safety control logic 400 can be implemented as an algorithm on a server (e.g., server 102), a machine learning module, or other suitable system. Additionally, the personnel safety control logic 400 can implement or incorporate one or more features of the safety assurance system 200, including the establishment system 202 (with corresponding modules 122, 124, and 126), coordination system 204 (with corresponding modules 128, 130, and 132), and collision avoidance system

206 (with corresponding modules 134 and 136). The personnel safety control logic 400 can be achieved with software, hardware, an application programming interface (API), a network connection, a network transfer protocol, HTML, DHTML, JavaScript, Dojo, Ruby, Rails, other suitable applications, or a suitable combination thereof.

The personnel safety control logic 400 can leverage the ability of a computer platform to spawn multiple processes and threads by processing data simultaneously. The speed and efficiency of the personnel safety control logic 400 is greatly improved by instantiating more than one process to facilitate the enhancing of personnel safety. However, one skilled in the art of programming will appreciate that use of a single processing thread may also be utilized and is within the scope of the present disclosure.

The personnel safety control logic 400 process flow of the present embodiment begins at step 402, wherein the control logic 400 receives a location. In one embodiment, the location can include a location of a constituent. In another embodiment, the location can include a location of a portion/division of the railroad track. In another embodiment, the location can include GPS coordinates. In another embodiment, the location received at step 402 can include a location where work is to be performed on a track. In another embodiment, the location can include a client location. The control logic 400 then proceeds to step 404.

At step 404, the control logic 400 can receive division data. In one embodiment, division data can include data related to a segment of a track. For example, division data can include curvature data, tie data, rail data, geography, topography, environmental data, or any other data related to a particular division of a track. In another example, division data can include a max allowed speed for a particular division. In another example, division data can include, e.g., a recommended sighting distance and/or a breaking distance. In another example, division data can include weather data, such as precipitation data. In another embodiment, the division data can include a location of the division. The control logic 400 then proceeds to step 406.

At step 406, the control logic 400 can determine a sighting distance. For example, the control logic 400 can utilize the location and/or the division data received in steps 302 and 404 to determine an appropriate sighting distance. In one example, a sighting distance can be a maximum distance a worker can see down a track from a particular location, taking into account, e.g., typography, rail curvature, environmental data, or any other relevant data. In another example, the control logic 400 can determine that the location received at step 302 is a particular distance from a curve in the track (as can be indicated by, e.g., division data received at step 404) around e.g., a hill, and can further determine that the sighting distance ends at the curve because it is not possible to see the track on the other side of the curve that is located on the other side of the hill. In another example, the control logic 400 can determine that weather conditions are present that can shorten a sighting distance, and therefore determine that a sighting distance should be lower than if weather conditions were clear. In another embodiment, a given division can include a recommended and/or default sighting distance, and the control logic 400 can determine that the default sighting distance should be utilized. In another embodiment, the control logic 400 can utilize, e.g., a max speed of a particular division (such as can be received at step 404) to determine a maximum distance that a worker should keep visible while working, and such distance can be considered a sighting distance. The control logic 400 then proceeds to step 408.

That step 408, the control logic 400 can determine a place of safety. In one embodiment, the place of safety can include a location proximate a railroad track at which a worker can be to maintain a safe distance from the track, such as if a train is traveling down the track. For example, the control logic 400 can utilizes the division data, including, for example, geographical data, to identify the closest place of safety to the position on the track that the worker is working on. In one example, if the worker is performing maintenance on a bridge, the control logic 400 can utilized the division data to determine that the closest place of safety can be at or near one of the ends of the bridge. In one embodiment, the control logic 400 can determine from the division data that the worker must travel to a particular location in order to maintain a safe distance from the track. In another embodiment, the division data can include a recommended and/or default place of safety (such as can be received at step 404), and the control logic 400 can determine that the default place of safety should be utilized. In another embodiment, the place of safety can be determined by the control logic 400 to be any area proximate a track that is a certain distance from the track. The control logic 400 then proceeds to step 410.

At step 410, the control logic 400 can determine an alert method. For example, the control logic 400 can determine that an alert generated should be transmitted via email, text, call, or any other messaging system. In another example, the control logic 400 can determine that an alert generated should be transmitted via an alert device, such as a device capable of communicating alerts in accordance with the principles of the present disclosure. In another embodiment, the control logic 400 can determine that an alert should be generated via haptic feedback generation on, for example, a wearable device. In another embodiment, the control logic 400 can determine that an alert should be transmitted via a plurality of methods. The control logic 400 then proceeds to step 412.

At step 412, the control logic 400 can transmit data. In one embodiment, the control logic 400 can transmit all or some of the data received and steps 302 through 410. In another embodiment, the control logic 400 can transmit data in the form of a safety plan. For example, the control logic 400 can generate a safety plan including identification information, a location, and/or a sighting distance, and transmit the safety plan throughout a system. The control logic 400 can transmit data to another system, personnel, a PTC system, a vehicle, or to any other suitable constituent. In one embodiment, transmission of data at step 412 can take the form of an alert and/or indication that work has begun on a particular segment and/or division of a track. In another embodiment, the transmission can indicate that work will begin at a certain point in the future. The control logic 400 then proceeds to step 414.

At step 414, the control logic 400 can receive position data. In one embodiment, position data can include a position and/or location data related to a constituent, such as a worker and/or a vehicle. In another example, position data can include velocity, direction of travel, identification information, proximity data, track data, or any other data related to a constituent or a position of a constituent with respect to a railroad track. In one example, the position data can include a position of a vehicle on a railroad track. In another example, the position data can include GPS data. The control logic 400 then proceeds to steps 416 and 418.

At step 416, the control logic 400 can receive a signal. For example, the control logic 400 can be an operable communication with a receiver, such as a wireless receiver, that can be configured to detect broadcasted signals. In one embodiment, the control logic 400 can utilize a radio frequency receiver, a radar receiver, a LIDAR receiver, or any other suitable receiver. In another embodiment, the control logic 400 can receive a signal from another system. For example, the control logic 400 can receive an indication from a system that is operable communication with a train. In another embodiment, the control logic 400 can receive a signal from a vehicle, such as a train, that is traveling down tracks. For example, the control logic 400 can be an operable communication with the receiver that can be positioned proximate a railroad track. In another example, the control logic 400 can be in operable communication with a receiver that can be position proximate a division in which a worker is located, such as to perform maintenance on the track. The control logic 400 then proceeds to step 420.

At step 420, the control logic can determine whether a position is indicated. In one embodiment, the signal received at step 416 can include an indication of position, such as a position of a source of the signal. For example, the signal can be generated by a railroad constituent, such as a vehicle, and the signal can include coordinates of the constituent. In another embodiment, the control logic 400 can determine if the signal includes a division of a track, latitude and longitude, GPS coordinates, or any other indication of position. If the signal received in step 416 indicates position, the control logic then proceeds to step 422. If the signal does not indicate a position, the control logic then proceeds to step 424.

At step 422, the control logic 400 can compare a position of a client and the position of a vehicle. For example, the control logic can utilize position indications from the signal received at step 416 and/or position data received at step 414. In one embodiment, the control logic can receive the client position at step 414 and can further receive a vehicle position at step 416 as part of the received signal. And another embodiment, the control logic 400 can compare the client position and the vehicle position, such as to determine a track distance between the client and the vehicle. The control logic then proceeds to step 418.

At step 418, the control logic 400 can determine whether a proximity threshold is satisfied. For example, the control logic 400 can utilize a client position and a vehicle position to determine whether a proximity threshold is satisfied. For example, the control logic 400 can determine a track distance between a client and a vehicle and determine if such track distance is of a particular magnitude that can satisfy the proximity threshold. In another example, the control logic can utilize position data received at step 414 to make this determination. In another embodiment, the control logic can utilize position data received in step 414 as well as the comparison at step 422 to determine whether a proximity threshold is satisfied. If the proximity threshold is not satisfied, the control logic proceeds back to step 414. If the proximity threshold is satisfied, the control logic 400 then proceeds to step 428.

At step 424, the control logic can determine a signal strength. In one embodiment, the control logic 400 can determine a strength of the signal received in step 416. For example, the control logic 400 can determine a magnitude of the signal. In another example, the signal received at step 416 can be a radio frequency signal, and the control logic 400 can determine the strength of the signal. In one embodiment, the signal strength can indicate a distance from which the signal is broadcast. For example, a signal strength determined at step 424 can be stronger if the source of the signal is closer in distance to the receiver. In another example, the signal strength determined at step 424 can be weaker if the source of the signal is farther in distance from the receiver. The control logic then proceeds to step 426.

At step 426, the control logic 400 can determine whether the signal strength determined at step 424 satisfies a signal strength threshold. For example, the control logic can determine a magnitude of the signal at step 424 and determine if such magnitude satisfies the signal strength threshold. In another example, the signal strength threshold can indicate a track distance between a receiver and a vehicle. For example, if the signal strength threshold is satisfied, this can indicate to the control logic 400 that a vehicle is a particular distance from a receiver. If the control logic 400 determines that the signal strength threshold is not satisfied, the control logic then proceeds back to step 416. If the control logic 400 determines that the signal strength threshold is satisfied, the control logic then proceeds to step 428.

At step 428, the control logic 400 can generate an alert. For example, the control logic can generate an alert indicating that the proximity threshold was satisfied at step 418. In another example, the control logic 400 can generate an alert indicating that the signal strength threshold was satisfied. In one embodiment, the alert can indicate how close a vehicle is to a particular location, such as a worker location and/or an alert device and/or a receiver location. The control logic 400 then proceeds to step 430.

At step 430, the control logic 400 can transmit the alert generated at step 428. For example, the control logic can be an operable communication with an alert device, a client device, a siren, flashing lights, or any other suitable communicator and/or sensory communicator to transmit an alert. In another embodiment, the control logic 400 can transmit the alert among the system, such as the safety assurance system 200 or other system. In another embodiment, the control logic 400 can transmit the alert via any mechanism suitable to alert railroad constituents. The control logic 400 can then terminate or repeat any of the aforementioned steps.

In one embodiment, steps 402, 404, 406, 408, 410, 412, and 414 can correspond to the establishment system 202. In another embodiment, steps 416, 418, 420, 422, 424, and 426 can correspond to the coordination system 204. In another embodiment, steps 428 and 430 can correspond to the collision avoidance system 206.

Figure 5:
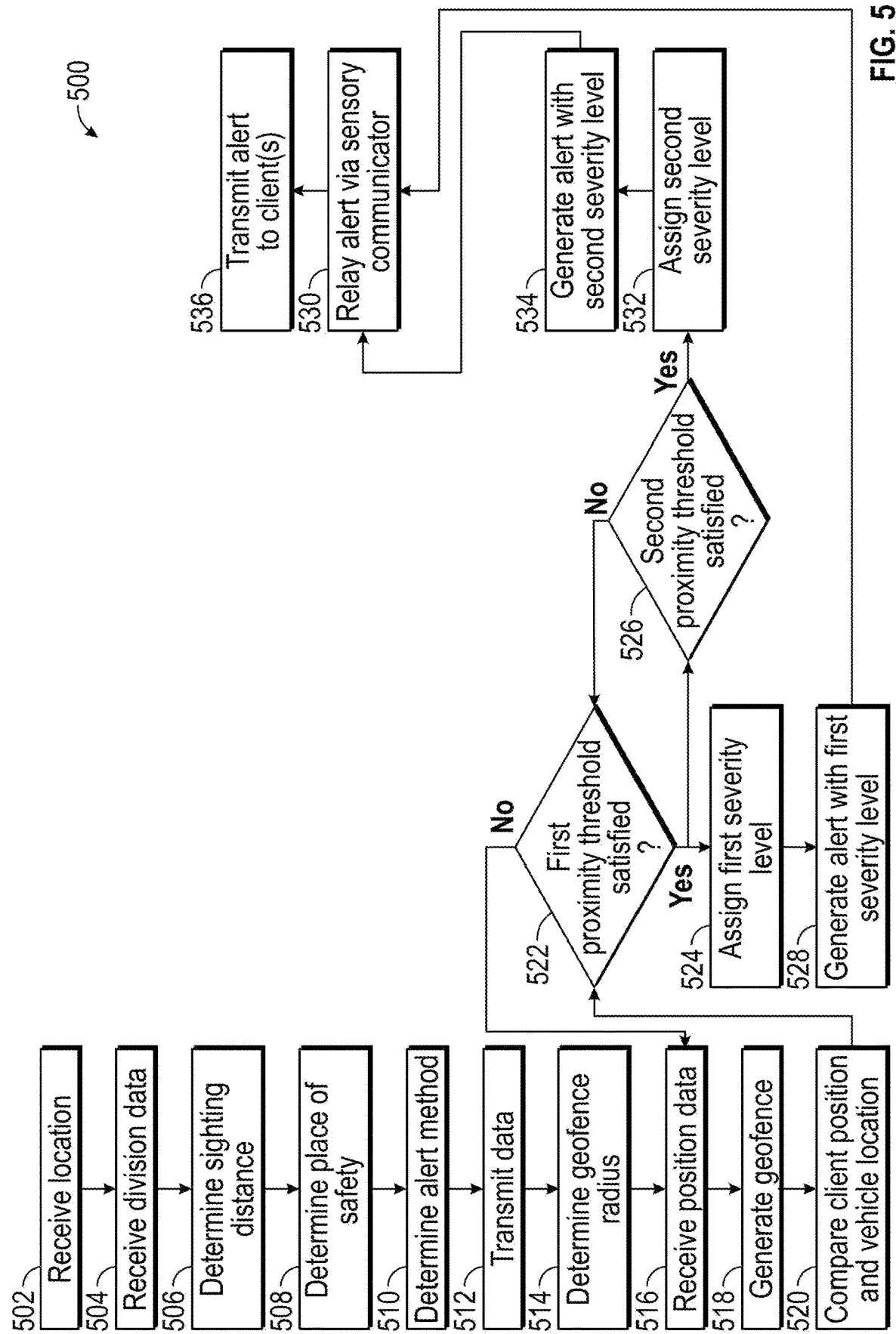
FIG. 5 illustrates a flowchart exemplifying safety alert control logic, in accordance with one or more exemplary embodiments of the present disclosure.

FIG. 5 illustrates a flow chart diagram 500 exemplifying control logic embodying features of a method of generating alerts for enhancing personnel safety 500, in accordance with an exemplary embodiment of the present disclosure. The safety alert control logic 500 can be implemented as an algorithm on a server (e.g., server 102), a machine learning module, or other suitable system. Additionally, the safety alert control logic 500 can implement or incorporate one or more features of the safety assurance system 200, including the establishment system 202 (with corresponding modules 122, 124, and 126), coordination system 204 (with corresponding modules 128, 130, and 132), and collision avoidance system 206 (with corresponding modules 134 and 136). The safety alert control logic 500 can be achieved with software, hardware, an application programming interface (API), a network connection, a network transfer protocol, HTML, DHTML, JavaScript, Dojo, Ruby, Rails, other suitable applications, or a suitable combination thereof.

The safety alert control logic 500 can leverage the ability of a computer platform to spawn multiple processes and threads by processing data simultaneously. The speed and efficiency of the safety alert control logic 500 is greatly improved by instantiating more than one process to facilitate alert generation to increase personnel safety. However, one skilled in the art of programming will appreciate that use of a single processing thread may also be utilized and is within the scope of the present disclosure. In one embodiment, be safety alert control logic 500 can be implemented in and/or via an alert device, such as an alert device disposed proximate a railroad track.

The safety alert control logic 500 process flow of the present embodiment begins at step 502, wherein the control logic 500 receives a location. In one embodiment, the location can include a location of a constituent. In another embodiment, the location can include a location of a portion/division of the railroad track. In another embodiment, the location can include GPS coordinates. In another embodiment, the location received at step 502 can include a location where work is to be performed on a track. In another embodiment, the location can include a client location. The control logic 500 then proceeds to step 504.

At step 504, the control logic 500 can receive division data. In one embodiment, division data can include data related to a segment of a track. For example, division data can include curvature data, tie data, rail data, geography, topography, environmental data, or any other data related to a particular division of a track. In another example, division data can include a max allowed speed for a particular division. In another example, division data can include, e.g., a recommended sighting distance and/or a breaking distance. In another example, division data can include weather data, such as precipitation data. In another embodiment, the division data can include a location of the division. The control logic 500 then proceeds to step 506.

At step 506, the control logic 500 can determine a sighting distance. For example, the control logic 500 can utilize the location and/or the division data received in steps 502 and 504 to determine an appropriate sighting distance. In one example, a sighting distance can be a maximum distance a worker can see down a track from a particular location, taking into account, e.g., typography, rail curvature, environmental data, or any other relevant data. In another example, the control logic 500 can determine that the location received at step 502 is a particular distance from a curve in the track (as can be indicated by, e.g., division data received at step 504) around e.g., a hill, and can further determine that the sighting distance ends at the curve because it is not possible to see the track on the other side of the curve that is located on the other side of the hill. In another example, the control logic 500 can determine that weather conditions are present that can shorten a sighting distance, and therefore determine that a sighting distance should be lower than if weather conditions were clear. In another embodiment, a given division can include a recommended and/or default sighting distance, and the control logic 500 can determine that the default sighting distance should be utilized. In another embodiment, the control logic 500 can utilize, e.g., a max speed of a particular division (such as can be received at step 504) to determine a maximum distance that a worker should keep visible while working, and such distance can be considered a sighting distance. The control logic 500 then proceeds to step 508.

That step 508, the control logic 500 can determine a place of safety. In one embodiment, the place of safety can include a location proximate a railroad track at which a worker can be to maintain a safe distance from the track, such as if a train is traveling down the track. For example, the control logic 500 utilizes the division data, including, for example, geographical data, to identify the closest place of safety to the position on the track that the worker is working on. In one example, if the worker is performing maintenance on a bridge, the control logic 500 can utilized the division data to determine that the closest place of safety can be at or near one of the ends of the bridge. In one embodiment, the control logic 500 can determine from the division data that the worker must travel to a particular location in order to maintain a safe distance from the track. In another embodiment, the division data can include a recommended and/or default place of safety (such as can be received at step 504), and the control logic 500 can determine that the default place of safety should be utilized. In another embodiment, the place of safety can be determined by the control logic 500 to be any area proximate a track that is a certain distance from the track. The control logic 500 then proceeds to step 510.

At step 510, the control logic 500 can determine an alert method. For example, the control logic 500 can determine that an alert generated should be transmitted via email, text, call, or any other messaging system. In another example, the control logic 500 can determine that an alert generated should be transmitted via an alert device, such as a device capable of communicating alerts in accordance with the principles of the present disclosure. In another embodiment, the control logic 500 can determine that an alert should be generated via haptic feedback generation on, for example, a wearable device. In another embodiment, the control logic 500 can determine that an alert should be transmitted via a plurality of methods. The control logic 500 then proceeds to step 512.

At step 512, the control logic 500 can transmit data. In one embodiment, the control logic 500 can transmit all or some of the data received and steps 502 through 510. In another embodiment, the control logic 500 can transmit data in the form of a safety plan. For example, the control logic 500 can generate a safety plan including identification information, a location, and/or a sighting distance, and transmit the safety plan throughout a system. The control logic 500 can transmit data to another system, personnel, a PTC system, a vehicle, or to any other suitable constituent. In one embodiment, transmission of data at step 512 can take the form of an alert and/or indication that work has begun on a particular segment and/or division of a track. In another embodiment, the transmission can indicate that work will begin at a certain point in the future. The control logic 500 then proceeds to step 514.

At step 514, the control logic 500 can determine a geofence radius. In one embodiment, the control logic 500 can determine to which distance a geofence should extend from a location. For example, the control logic 500 can utilize data received at any or all of steps 502 through 510 to determine what a geofence radius should be. And another embodiment, the control logic 500 can determine a geofence radius as calculated from the position of an alert device. In another embodiment, the control logic 500 can determine a geofence radius as determined from a location where work is to be performed. The control logic then proceeds to step 516.

At step 516, the control logic 500 can receive position data. In one embodiment, position data can include a position and/or location data related to a constituent, such as a worker and/or a vehicle. In another example, position data can include velocity, direction of travel, identification information, proximity data, track data, or any other data related to a constituent or a position of a constituent with respect to a railroad track. In one example, the position data can include a position of a vehicle on a railroad track. In another example, the position data can include GPS data. The control logic then proceeds to step 518.

At step 518, the control logic 500 can generate a geofence. And one embodiment, the control logic 500 can generate a geofence around an alert device that is positioned proximate railroad track. In another embodiment, the control logic 500 can generate a geofence around a worker location that can be indicated by data received at any of steps 502 through 510. In another embodiment, the control object 500 can generate a geofence around any railroad constituent, such as a vehicle, a client device, a worker, an alert device, or any other suitable railroad constituent. The control logic 500 then proceeds to step 520.

At step 520, the control logic 500 can compare a client position at a vehicle location. For example, the client position can be an alert device position. In another example, the vehicle location can be a train location. In one embodiment, the control logic 500 can determine whether the vehicle location falls within a geofence generated at step 518. In another embodiment, the control logic 500 can determine a track distance between a client and a vehicle. In another embodiment, the control logic 500 can determine a track distance between a vehicle and an outer boundary of the geofence generated at step 518. The control logic then proceeds to step 522.

At step 522, the control logic 500 can determine whether a first proximity threshold is satisfied. In one embodiment, the control logic 500 can utilize position data received at step 516 and the geofence generated at step 518 to determine whether a track distance magnitude satisfies the first proximity threshold. In another embodiment, the control logic 500 can utilize the comparison made at step 520 to determine whether the track distance between the client position and the vehicle location satisfies the first proximity threshold. In another embodiment, if the vehicle location is within the geofence generated at step 518, the control logic 500 can determine that the first proximity threshold is satisfied. In another embodiment, if the vehicle location is a particular track distance from the geofence generated at step 518, such as from an outer boundary of the geofence generated at step 518, the control logic 500 can determine that the first proximity threshold is satisfied. If the first proximity threshold is not satisfied, the control logic 500 then proceeds back to step 516. If the control logic 500 determines that the first proximity threshold is satisfied, the control logic then proceeds to step 524 and 526.

At step 524 the control logic 500 can assign a first severity level. in one embodiment, first severity level can indicate that the first proximity threshold was satisfied. For example, the first severity level can indicate that the vehicle location is within a particular distance of the client position and/or the geofence. The control logic then proceeds to step 528.

At step 528, the control logic 500 can generate an alert with the first severity level assigned at step 524 in accordance with the principles of the present disclosure. The control logic then proceeds to step 530.

At step 526, the control logic 500 can determine whether a second proximity threshold is satisfied. For example, the control logic 500 can utilized the position data received at step 516 and/or the geofence and/or comparisons from steps 518 and 520 to determine a track distance between a vehicle and a client and/or a geofence around the client. In one embodiment, the second proximity threshold can indicate that a vehicle is closer than the vehicle was when the first proximity threshold was satisfied. In this manner, the control logic 500 can determine whether a vehicle is getting closer to a client. If the control logic 500 determines that the second proximity threshold is not satisfied, the control object 500 proceeds back to step 522. If the control logic 500 determines that the second proximity threshold is satisfied, the control logic then proceeds to step 532.

At step 532, the control logic 500 can assign a second severity level. For example, the second severity level can indicate that both the first proximity threshold and the second proximity threshold are satisfied. In one embodiment, the second severity level can indicate a higher severity than the first severity level. For example, the second severity level can indicate that a train is imminently approaching and be designed to warn personnel on or near the track to immediately vacate the track and head to a place of safety, such as the place of safety determined at step 508. The control logic 500 then proceeds to step 534.

At step 534, the control logic 500 can generate an alert with the second severity level assigned at step 532. The control logic 500 then proceed to step 530.

At step 530, the control logic 500 can relay an alert via a sensory communicator. in one embodiment, the control logic 500 can relay the alert generated at step 528 having the first severity level. In another embodiment, the control object 500 can relay the alert generated at step 534 having the second severity level. In another embodiment, the control logic 500 can relay both of these alerts and/or any other alerts via the sensory communicator. For example, the control logic 500 can utilize the sensory communicator to indicate the severity level of the alert being relayed. For example, the sensory communicator can include any number of lights, speakers, haptic feedback devices, or any other sensory communicators suitable to communicate alerts. In one embodiment, the control logic 500 can be configured to utilize the sensory communicator to distinguish the severity level of the alert currently being relayed. For example, in relaying an alert having the first severity level, the control logic 500 can be configured to utilize a first type of flashing light on the sensory communicator, such as a yellow light, and generate a first sound via a speaker of the sensory communicator. In another example, the control logic 500 can be configured to utilize a second type of flashing light on the sensory communicator, such as a red light, and generate a second sound via speakers of the sensory communicator to indicate and alert having the second severity level. In this manner, the control logic 500 can communicate to railroad constituents the comparative proximity of a vehicle to a particular location. In another embodiment, the control logic 500 can indicate the imminency and/or danger of an approaching train to a particular location on a track. The control logic then proceeds to step 536.

At step 536, the control logic 500 can transmit one or more alerts to one or more clients in operable communication with the control logic 500. For example, the control logic 500 can transmit the alert to a cell phone, a wearable device, a computer and/or device, a PTC system, or any other suitable client or system capable of receiving an alert. In one embodiment, after the control logic 500 relays one or more alerts via the sensory communicator in step 530, the control logic 500 can additionally transmit the one or more alerts to client devices, such as to ensure that a given client is on notice of the alerts having the first and/or second severity levels. For example, the control logic 500 can transmit an alert to a worker having a wearable device and/or a cell phone, such that the worker is on notice of the alert. The control logic 500 can then terminate or repeat any of the aforementioned steps.

In one embodiment, steps 502, 504, 506, 508, 510, 512, 514, 516, and 518 can correspond to the establishment system 202. In another embodiment, steps 520, 522, and 526 can correspond to the coordination system 204. In another embodiment, steps 524, 528, 532, 534, 530, and 536 can correspond to the collision avoidance system 206.

Figure 6:
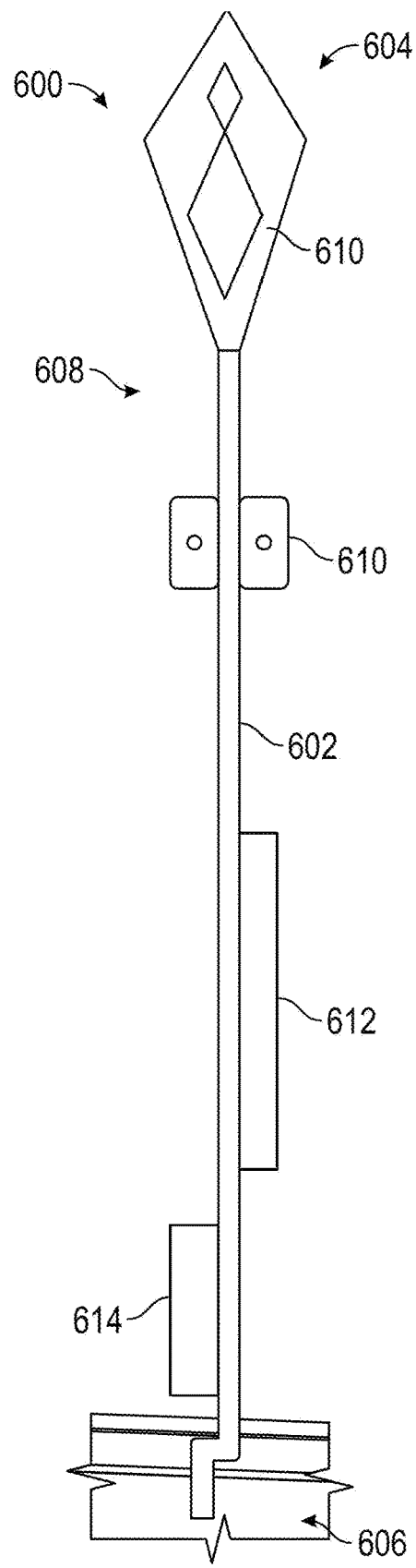
FIG. 6 illustrates an exemplary alert apparatus in accordance with one or more exemplary embodiments of the present disclosure.

FIG. 6 illustrates an exemplary alert apparatus (alert device) 600 in accordance with one or more embodiments of the present disclosure. In one embodiment, the alert device 600 can include a support member 602. For example, the support member 602 can include a first end 604 and a second end 606. In another example, the support member 602 can take the form of a rod, shaft, tower, or any other configuration suitable to provide the alert device 600 with height. In another embodiment, the support member 602 can provide a central structure to the alert device 600. In another embodiment, the first end 604 can be located at the top of the alert device 600. In another embodiment, the second end 606 can be located at the bottom of the alert device 600. In another embodiment, the second end 606 can be configured to support the alert device 600 in an upright position. For example, the second end 606 can include at base, stand, clamps, feet, screws, or any other mechanism suitable to support the device 600. In another example, the second end of 606 can be configured to couple to a railroad constituent, such as a rail, a tie, a support, a siding, or any other railroad constituent. In another embodiment, the second end 606 can be configured to couple with the ground. For example, the second end 606 can include a spike or a prong capable of inserting into the ground and supporting the alert device 606 in an upright position. In another embodiment, the first end 604 can be configured to extend upwards. For example, the first end 604 can be configured to arise to a particular height configured to allow the first end 604 to be viewable from afar. In another embodiment, the first end 604 can be extendable, such as telescopically.

In another embodiment, the alert device 600 can include a sensory communicator 608. In one embodiment, the sensory communicator can be coupled with the device 600 proximate the first end 604 of the device 600. In one example, the sensory communicator 608 can include one or more visual indicators 610. In another example, the visual indicator 610 can be lights, signs, colors, motion generators, or any other mechanism or device suitable of being seen, such as by the human eye. In one embodiment, the visual indicator 610 can include lights. In another embodiment, the visual indicators 610 can include colorful signs. In another example, the visual indicator 610 can include spinners, streamers, and/or flashers. In another embodiment, the visual indicator 610 can include any combination of visually prominent components. In another embodiment, the alert device 600 can include a sound generator 612. For example, the sound generator 612 can include a speaker configured to generate sound. In another embodiment, the sound generator 612 can include a siren, rumbler siren, whistle, or any other mechanism or component suitable to generate noise.

In another embodiment, the alert device 600 can include a housing 614. in one embodiment, the housing 614 can be coupled to the support member 602. For example, the housing 614 can be coupled proximate the second end 606 of the support member 602. In another example, the housing 614 can be coupled to the support member such that the housing can be accessible by personnel. In one embodiment, the housing 614 can include a circuit box, breakers, or any other components. In one example, the housing 614 can be configured to be weatherproof. In another example, the housing 614 can include a wireless transceiver. For example, the wireless transceiver can be configured to receive signals. In another embodiment, the wireless transceiver can be configured to transmit signals. In another example, the wireless transceiver can be configured to receive radio frequency signals, Wi-Fi signals, cellular data signals, or any other wireless signals. In another embodiment, the wireless transceiver can be configured to communicate with and/or transmit signals to cell phones, wearable devices, computers, PTC systems, or any other railroad constituents. In another embodiment, the housing 614 can include a processor, memory, and/or any other components suitable to execute algorithms, program instructions, and/or methods in accordance with the principles of the present disclosure. For example, the housing 614 can include a processor capable of executing the safety alert control logic 500. In another embodiment, the housing 614 can include a controller. In one embodiment, the controller can be capable of executing machine readable instructions to perform program steps.

Figure 7A:
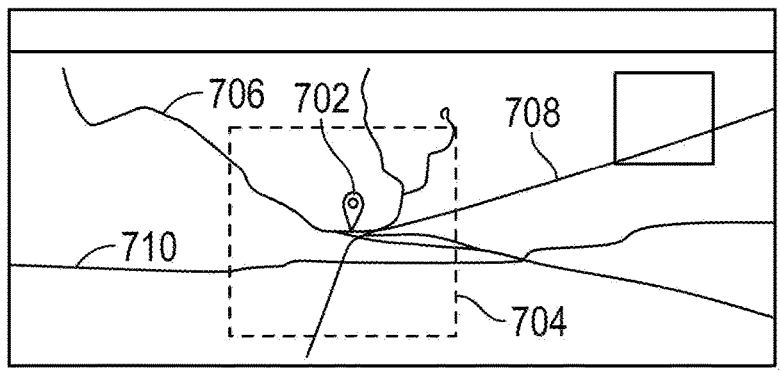
FIG. 7A illustrates an exemplary rendering of a system for railroad track personnel safety in accordance with one or more exemplary embodiments of the present disclosure.

FIG. 7A illustrates an exemplary rendering of a system for railroad track personnel safety in accordance with one or more embodiments of the present disclosure. A worker location 702 can be indicated, such as within a map of a railroad infrastructure. In one embodiment, a geofence 704 can be disposed around the worker location 702. The geofence 704 can be circular, rectangular, oval, diamond, triangular, or any other suitable shape. In another embodiment, a myriad of railroad tracks 706, 708, 710 can intersect the geofence 704. In one example, as a vehicle or other railroad constituent travels down a track 706, 708, 710, if the vehicle intersects the geofence 704, control logic in accordance with the principles of the present disclosure can facilitate the assigning of severity levels, generation of alerts, proximity threshold determinations, and any other steps disclosed herein. In another embodiment, the geofences 704 can be considered a proximity threshold. For example, if a vehicle crosses the outer boundary of the geofence 704, a proximity threshold can be considered to be satisfied such that an alert can be generated having an assigned severity level.

Figure 7B:
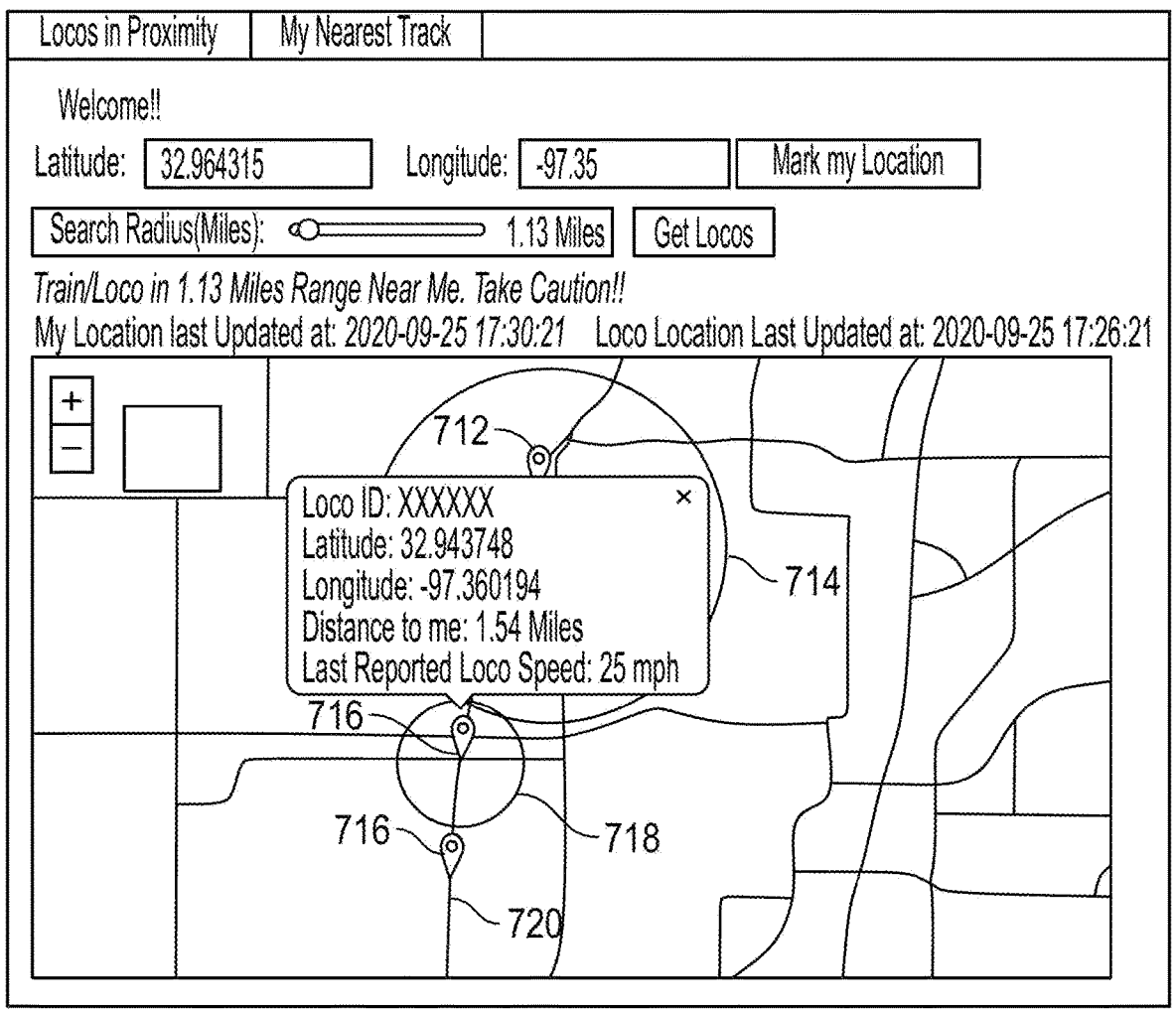
FIG. 7B illustrates an exemplary rendering of a geofencing system for railroad track personnel safety in accordance with one or more exemplary embodiments of the present disclosure.

FIG. 7B illustrates an exemplary rendering of a geofencing system for railroad track personnel safety in accordance with one or more embodiments of the present disclosure. A work location (client location) 712 can be indicated on a map including railroad track division data. In one embodiment, a client geofence 714 can be generated around the location 712. For example, the client geofence 714 can extend a particular radius from the client location 712. In another embodiment, a vehicle location 716 can also be indicated. For example, a vehicle location 716 can be traced along a railroad track 720. In another embodiment, a vehicle geofence 718 can be generated around a vehicle and travel with the vehicle. In another embodiment, the vehicle geofence 718 can intersect the client geofence 714. For example, intersection of the vehicle geofence 718 with the client geofence 714 can facilitate the assigning of severity levels, generation of alerts, and/or any other steps in accordance with the principles of the present disclosure.

Figure 8:
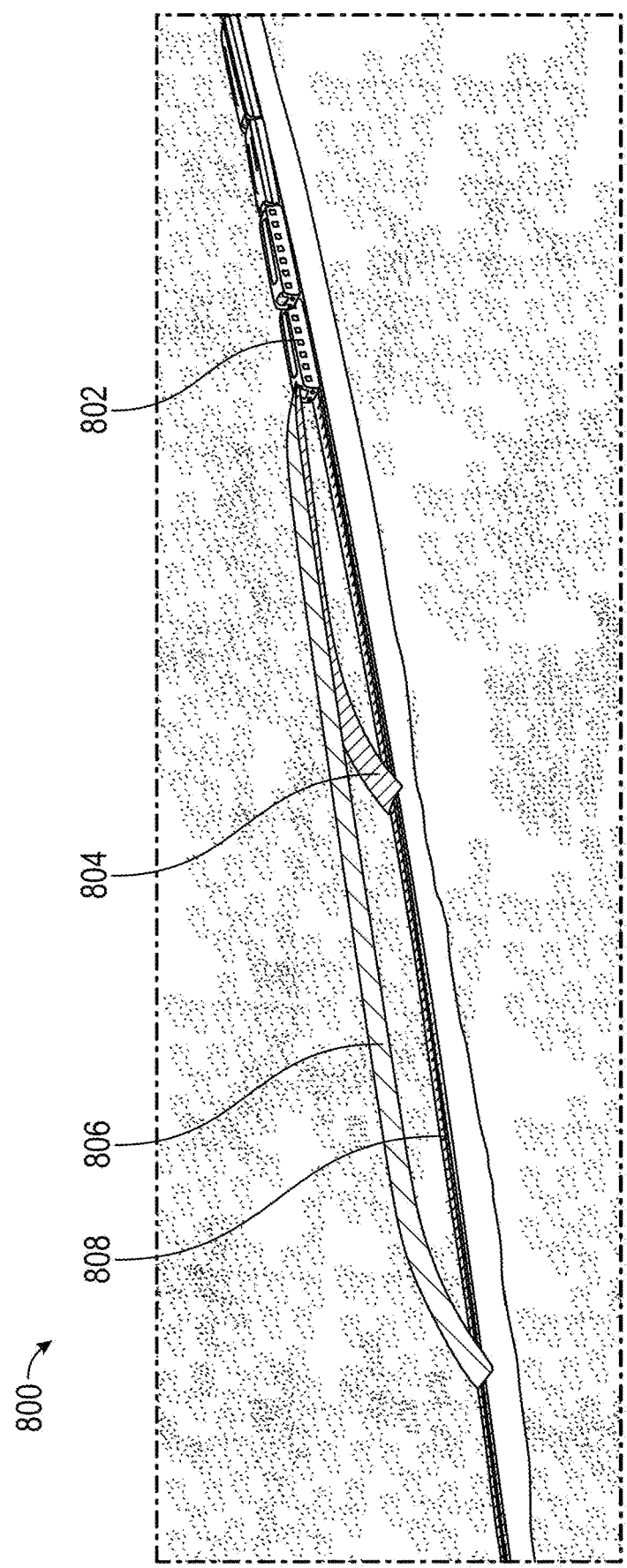
FIG. 8 depicts a proximity detection system in accordance with one or more exemplary embodiments of the present disclosure.

FIG. 8 depicts another embodiment of the present disclosure. A proximity detection system 800 can include a rail vehicle 802, such as a train. In one embodiment, the rail vehicle 802 can be travelling on a track 808. In another embodiment, the rail vehicle 802 can include one or more proximity fields 804, 806 that can be utilized in proximity detection, forecasting, alert generation, alter delivery, and/or interference detection in accordance with the principles of the present disclosure. For example, the first proximity field 806 can be a radio frequency signal broadcasted from the rail vehicle 802. The first proximity field at 806 can be a broadcasted signal having a particular signal strength. In one embodiment, as the rail vehicle 802 travels down the track 808, the signal 806 can precede the rail vehicle 802. In another embodiment, the signal 806 can be received by a receiver, such as a received included on an alert device proximate the track 808. In another embodiment, reception of the first signal 806 by a receiver can facilitate alert severity level assignment (e.g., assignment of a first severity level) and alert generation in accordance with the principles of the present disclosure. In another embodiment, receiving of the first signal 806 can indicate that the vehicle 802 is of a particular distance from the location of reception.

In another embodiment, a second proximity field 804 can also extend from the rail vehicle 802. For example, the second proximity field 804 can be a broadcasted signal originating from the vehicle 802. In another embodiment, the second signal 804 can have a higher magnitude than the first signal 806. In another embodiment, the signal 804 can be received by a receiver, such as a received included on an alert device proximate the track 808. In another embodiment, reception of the second signal 804 by a receiver can facilitate alert severity level assignment (e.g., assignment of a second severity level) and alert generation in accordance with the principles of the present disclosure. In another embodiment, receiving of the second signal 804 can indicate that the vehicle 802 is of a particular distance from the location of reception. In another embodiment, receiving of the second signal 804 can indicate that the vehicle 802 is closer to the point of reception then it was at initial reception of the first signal 806. In another embodiment, reception of the second signal 804 can facilitate the assignment of a higher severity level or a more severe severity a level for an alert to be generated, as compared to a severity level indicating that the first signal 806 was received. In another embodiment, reception of the first and second signals 806, 804, and/or recognition of the first and second proximity fields 806, 804, can instantiate generation of different types of alerts indicating which proximity field 804, 806 caused the alert instantiation. In this manner, the system 800 can signify to railroad constituents and/or railroad personnel of an approaching vehicle, such as vehicle 802.

It will be understood by those having skill in the art that the systems and methods disclosed herein can implement numerous proximity thresholds, temporal thresholds, signal strength thresholds, and geofences within the same process flow to tailor the alert generation and severity level assignments to fit specific needs. In one embodiment, multiple geofences can be generated around clients and vehicles, such that different intersections of different constituents can facilitate generation of different types of alerts. For example, if a first client geofence intersects a second vehicle geofence, a first alert can be generated; if a first client geofence intersects a first vehicle geofence, a second alert can be generated. As another example, multiple proximity thresholds can be utilized around a given work location. For example, multiple proximity thresholds with different magnitudes can be utilized to generate alerts indicating how far a given vehicle is from a particular work location. In another embodiment severity levels can vary with the proximity of the vehicle—for example, the closer a vehicle is to a given location, the more sever an alert can be. In another example, geofence intersections and/or proximity thresholds satisfactions can be forecasted at a particular point in the future, and in one embodiment, such point in time can be utilized to determine whether one or more temporal thresholds are satisfied. For example, if a geofence intersection is predicted for one hour from the time of forecast, a first temporal threshold can be satisfied, leading to an alert generation having, e.g., a low severity level, and notifying personal that a vehicle will be approaching within an hour. In another example, while the first temporal threshold can be satisfied, a second temporal threshold may not be satisfied, meaning that the control logic can determine that an alert with a higher severity level should not be generated.

The present disclosure achieves at least the following advantages:

1. Enhancing worker safety while performing track maintenance;
2. Assigning and indicating severity of alerts to optimize evacuation time;
3. Providing proximity forecasts to enable alert generation without network connectivity;
4. Providing redundant alert measures to ensure personnel notification;
5. Communicating alerts via sensory communication to increase likelihood of alert recognition.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for railroad track personnel safety, comprising:

a memory having a first database with data, thresholds, and specifications related to clients, vehicles, and railroad tracks; and a computer processor operably coupled to the memory and capable of executing machine-readable instructions to perform program steps, the program steps including:

receiving a position of a client proximate a section of railroad tracks over an encrypted network;

receiving a position of a vehicle proximate the section of railroad tracks over the encrypted network;

generating, via the processor, a client geofence around at least a portion of the client;

generating, via the processor, a vehicle geofence around at least a portion of the vehicle;

generating an alert via the processor if the vehicle geofence intersects the client geofence.

2. The system of claim 1, wherein the program steps further include:

determining if a temporal threshold is satisfied;

assigning a first severity level to the at least one alert if the temporal threshold is not satisfied; and assigning a second severity level to the at least one alert if the temporal threshold is satisfied.

3. The system of claim 1, wherein the program steps further include:

comparing the client position and the vehicle position; and assigning a first severity level to the alert if a first proximity threshold is satisfied.

4. The system of claim 3, wherein the program steps further include:

generating a second alert having a second severity level if a second proximity threshold is satisfied.

5. The system of claim 1, wherein the program steps further include:

receiving vicinage data;

inspecting the vicinage data for one or more artifacts; and generating a second alert via the processor if one or more artifacts are detected.

6. The system of claim 1, wherein the vehicle is a train.

7. A system for generating alerts for enhancing personnel safety, comprising:

a memory having a first database with data, thresholds, and specifications related to devices, vehicles, and train tracks;

an alert device including a wireless transceiver and a sensory communicator; and a computer processor operably coupled to the memory and to the alert device, wherein the processor is capable of executing machine-readable instructions to perform program steps, the program steps including:

receiving a position of a client proximate a section of railroad tracks over an encrypted network;

receiving a position of a vehicle proximate the section of railroad tracks over the encrypted network;

determining a track distance between the client and the vehicle;

determining if the track distance satisfies a first proximity threshold;

generating a first alert having a first severity level and relaying the alert to the alert device if the first proximity threshold is satisfied;

determining if the track distance satisfies a second proximity threshold; and generating a second alert having a second severity level and relaying the second alert to the alert device if the second proximity threshold is satisfied.

8. The system of claim 7, wherein the program steps further include:

receiving division data;

determining, using the division data, a geofence radius; and generating a geofence using the alert device.

9. The system of claim 7, wherein the program steps further include transmitting the first alert and the second alert to at least one client.

10. The system of claim 7, wherein the alert device is proximate a railroad track.

11. The system of claim 7, wherein the vehicle is a train.

12. The system of claim 7, wherein the sensory communicator includes haptic feedback.

13. The system of claim 7, wherein the sensory communicator includes a sound generator.

14. The system of claim 7, wherein the sensory communicator includes a visual indicator.

15. A method for enhancing personnel safety, comprising:

positioning an alert device proximate a railroad track;

determining an alert device position;

determining a vehicle position;

receiving, via the alert device, a signal from a vehicle on the railroad track;

determining a signal strength; and generating an alert via the alert device if a signal strength threshold is satisfied.

16. The method of claim 15, further comprising the steps of:

determining a track distance between the alert device and the vehicle; and generating an alert via the alert device if the track distance satisfies a proximity threshold.

17. An alert apparatus comprising:

a support member having a first end and a second end;

a sensory communicator operably coupled to the support member, the sensory communicator including at least one sound generator and at least one visual indicator;

a wireless transceiver operably coupled to the support member; and a controller operably coupled to the support member and capable of executing machine-readable instructions to perform program steps, the program steps including:

generating a geofence around at least a portion of the alert device;

receiving a vehicle position;

determining, using the geofence and the vehicle position, if a first proximity threshold is satisfied;

if the first proximity threshold is satisfied, generating a first alert having a first severity level and relaying the first alert via the sensory communicator;

determining, using the geofence and the vehicle position, if a second proximity threshold is satisfied; and if the second proximity threshold is satisfied, generating a second alert having a second severity level and relaying the second alert via the sensory communicator.

18. The apparatus of claim 17, wherein the program steps further include:

receiving division data; and determining a geofence radius using the division data.

19. The apparatus of claim 17, wherein the visual indicator is coupled to the apparatus proximate the first end of the support member.

20. The apparatus of claim 17, wherein the second end is configured to stabilize the apparatus in an upright position.

\* \* \* \* \*